United States Patent
Hinokuma et al.

(10) Patent No.: US 6,777,133 B2
(45) Date of Patent: Aug. 17, 2004

(54) PROTON CONDUCTOR, PRODUCTION METHOD THEREOF, AND ELECTROCHEMICAL DEVICE USING THE SAME

(75) Inventors: Koichiro Hinokuma, Kanagawa (JP); Björn Pietzak, Kanagawa (JP); Constance Gertrud Rost, Kanagawa (JP); Masafumi Ata, Kanagawa (JP)

(73) Assignee: Sony Corporation, Tokyo (JP)

( * ) Notice: Subject to any disclaimer, the term of this patent is extended or adjusted under 35 U.S.C. 154(b) by 266 days.

(21) Appl. No.: 10/171,930

(22) Filed: Jun. 14, 2002

(65) Prior Publication Data

US 2002/0197521 A1 Dec. 26, 2002

Related U.S. Application Data

(63) Continuation of application No. 09/619,166, filed on Jul. 19, 2000, now Pat. No. 6,495,290, which is a continuation-in-part of application No. 09/396,866, filed on Sep. 15, 1999, now abandoned.

(30) Foreign Application Priority Data

Jul. 19, 1999 (JP) .......................................... H11-204038
Mar. 3, 2000 (JP) ..................................... P2000-058116
May 29, 2000 (JP) ..................................... P2000-157509

(51) Int. Cl.$^7$ .......................... H01M 4/58; C01B 31/00
(52) U.S. Cl. ................... 429/231.8; 429/306; 429/188; 429/324; 423/445 B; 423/445 R; 423/447.1; 423/447.2
(58) Field of Search .............................. 429/231.8, 306, 429/188, 324; 423/445 B, 445 R, 447.1, 447.2

(56) References Cited

U.S. PATENT DOCUMENTS 5,470,680 A  11/1995 Loufty et al.
6,162,926 A * 12/2000 Murphy et al. ............. 548/417
6,231,980 B1  5/2001 Cohen et al.

FOREIGN PATENT DOCUMENTS

JP         3-167712       7/1991
JP         2000-256007    9/2000

OTHER PUBLICATIONS

H.W. Kroto et al., $C_{60}$ Buckminsterfullerene, Nov. 1985, Nature v. 318, pp. 162–163.

Long Y. Chiang et al., Multi–hydroxy Additions onto $C_{60}$ Fullerene Molecules J. Chem. Soc., 1992 pp. 1791–1793.

(List continued on next page.)

*Primary Examiner*—Patrick Ryan
*Assistant Examiner*—Angela J. Martin
(74) *Attorney, Agent, or Firm*—Bell, Boyd & Lloyd LLC

(57) ABSTRACT

A proton conductor mainly contains a carbonaceous material derivative, such as, a fullerene derivative, a carbon cluster derivative, or a tubular carbonaceous material derivative in which groups capable of transferring protons, for example, —OH groups or —OSO$_3$H groups are introduced to carbon atoms of the carbonaceous material derivative. The proton conductor is produced typically by compacting a powder of the carbonaceous material derivative. The proton conductor is usable, even in a dry state, in a wide temperature range including ordinary temperature. In particular, the proton conductor mainly containing the carbon cluster derivative is advantageous in increasing the strength and extending the selection range of raw materials. An electrochemical device, such as, a fuel cell, that employs the proton conductor is not limited by atmospheric conditions and can be of a small and simple construction. The proton conductor may contain a polymer in addition to the carbonaceous material derivative, which conductor can be formed, typically by extrusion molding, into a thin film having a large strength, a high gas permeation preventive ability, and a good proton conductivity.

14 Claims, 21 Drawing Sheets

$C_{60}(OH)_{12}$

OTHER PUBLICATIONS

Long Y. Chiang et al., Efficient Synthesis of Polyhydroxylated Fullerene Derivativs via Hydrolysis of Polcyclosulfated Precursors, American Chem. Society, 1994, pp. 3960–3969.

C. Park et al., Further Studies of the Interaction of Hydrogen with Graphite Nanofibers, J. Chem. Society, 1999 pp. 10572–10581.

Shaffer et al., Dispersion and Packing of Carbon Nanotubes, Carbon, vol. 36, No. 11, pp. 1603–1612 (1998).

* cited by examiner $C_{60}(OH)_{12}$ $C_{60}(OH)_{12}$

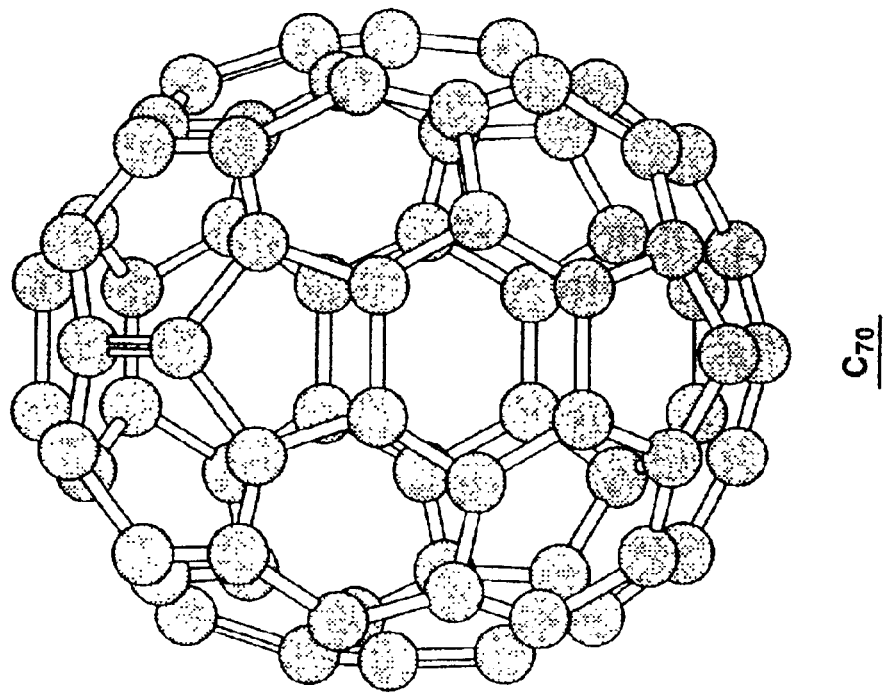
FIG.3B $C_{70}$
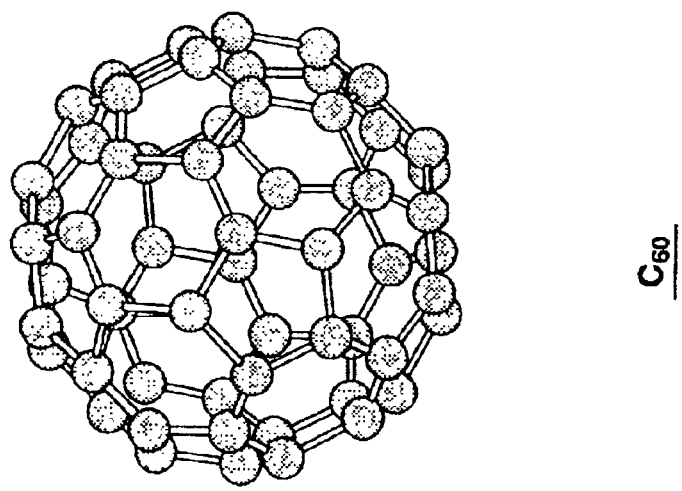
FIG.3A $C_{60}$

EXAMPLES OF CARBON CLUSTERS

EXAMPLES OF CARBON CLUSTERS HAVING
PARTIAL FULLERENE STRUCTURE

EXAMPLES OF CARBON CLUSTERS
HAVING DIAMOND STRUCTURE

EXAMPLES OF CARBON CLUSTERS
BONDED TO EACH OTHER

A : INVENTIVE EXAMPLE 1
B : COMPARATIVE EXAMPLE 1

SWCNT
(SINGLE - WALL CARBON NANO - TUBE)

MWCNT
(MULTI - WALL CARBON NANO - TUBE)

PROTON CONDUCTOR, PRODUCTION METHOD THEREOF, AND ELECTROCHEMICAL DEVICE USING THE SAME

RELATED APPLICATION DATA

This appl. is a Continuation of prior application Ser. No. 09/619,166, filed Jul. 19, 2000 now U.S. Pat. No. 6,495,290, which is a Continuation-in-part (CIP) of prior application Ser. No. 09/396,866, filed Sep. 15, 1999, now abandoned.

The present application claims priority to Japanese Patent Application No. H11-204038 filed on Jul. 19, 1999, Japanese Patent Application No. P2000-058116 filed on Mar. 3, 2000, and Japanese Patent Application No. P2000-157509 filed on May 29, 2000. The above-referenced Japanese patent applications are incorporated herein by reference to the extent permitted by law.

BACKGROUND OF THE INVENTION

1. Field of the Invention

The present invention relates to a proton conductor, a production method thereof, and an electrochemical device using the proton conductor.

2. Description of the Prior Art

In recent years, as a polymer solid-state electrolyte type fuel cell has been used to power cars, there has been known a fuel cell using a polymer material having a proton (hydrogen ionic) conductivity such as a perfluorosulfonate resin (for example, Nafion® produced by Du Pont).

As a relatively new proton conductor, there has also been known a polymolybdate having large amount of hydrated water such as $H_3Mo_{12}PO_{40} \cdot 29H_2O$ or an oxide having a large amount of hydrated water such as $Sb_2O_6 \cdot 5.4H_2O$.

The above-described polymer material and hydrated compounds each exhibit, if placed in a wet state, a high proton conductivity at a temperature near ordinary temperature.

For example, the reason why the perfluorosulfonate resin can exhibit a very high proton conductivity even at ordinary temperature is that protons ionized from sulfonate groups of the resin are bonded (hydrogen-bonded) with moisture already entrapped in a polymer matrix in a large amount, to produce protonated water, that is oxonium ions ($H_3O^+$), and the protons in the form of the oxonium ions can smoothly migrate in the polymer matrix.

More recently, there has been also developed a proton conductor having a conduction mechanism quite different than that of each of the above-described proton conductors.

That is to say, it has been found that a composite metal oxide having a perovskite structure, such as, $SrCeO_3$ doped with Yb, exhibits a proton conductivity without use of moisture as a migration medium. The conduction mechanism of this composite metal oxide has been considered such that protons are conducted while being singly channeled between oxygen ions forming a skeleton of the perovskite structure.

The conductive protons, however, are not originally present in the composite metal oxide but are produced by the following mechanism: namely, when the perovskite structure contacts the steam contained in an environmental atmospheric gas, water molecules at a high temperature react with oxygen deficient portions which have been formed in the perovskite structure by doping Yb or the like, to generate protons.

The above-described various proton conductors, however, have the following problems.

The matrix material such as the above-identified perfluorosulfonate resin must be continuously placed in a sufficiently wet state during use in order to keep a high proton conductivity.

Accordingly, a configuration of a system, such as, a fuel cell using such a matrix material, requires a humidifier and various accessories, thereby giving rise to problems in enlarging the scale of the system and raising the cost of the system.

The system using the matrix material has a further problem that the range of the operational temperature must be limited for preventing the freezing or boiling of the moisture contained in the matrix.

The composite metal oxide having the perovskite structure has a problem that the operational temperature must be kept at a high temperature of 500° C. or more for ensuring an effective proton conductivity.

In this way, the related art proton conductors have the problems that the atmosphere dependence on the performance of each conductor becomes high, and more specifically, moisture or stream must be supplied to the conductor to ensure the performance of the conductor, and further, the operational temperature of the conductor is excessively high or the range of the operational temperature is limited.

SUMMARY OF THE INVENTION

A first object of the present invention is to provide a proton conductor which is usable in a wide temperature range including ordinary temperature and has a low atmosphere dependence, that is, it requires no moisture despite whether or not the moisture is a migration medium; to provide a method of producing the proton conductor; and to provide an electrochemical device that employs the proton conductor. To meet this objective, the proton conductor includes a proton conductor material that at least has number of functional groups so as to be capable of transferring hydrogen protons between the functional groups of the proton conductor material. The proton conductor material includes a wide variety of carbonaceous materials, examples of which are described in greater detail below with respect to the various illustrative embodiments of the present invention, such as, the first, second, third and fourth proton conductors, production methods and electrochemical devices thereof.

A second object of the present invention is to provide a proton conductor which exhibits a film formation ability while keeping the above-described performance, to be thereby usable as a thin film having a high strength, a gas permeation preventive or impermeable performance, and a good proton conductivity, to provide a method of producing the proton conductor, and to provide an electrochemical device using the proton conductor.

The present invention provides a first proton conductor mainly containing a fullerene derivative obtained by introducing a number of functional groups so as to be capable of transferring protons between the functional groups of the fullerene derivative. The fullerene derivative includes a fullerene molecule or a plurality of fullerene molecules that each contain the functional groups so as to provide the fullerene derivative with the desirable proton conductivity properties as discussed and will be discussed in greater detail below.

The present invention also provides a first method of producing a proton conductor, including the steps of: producing a fullerene derivative by introducing functional groups so as to be capable of transferring protons as previously discussed; and compacting a powder of the fullerene derivative into a desired shape.

The present invention also provides a first electrochemical device including: a first electrode, a second electrode, and a proton conductor held between the electrodes, wherein the proton conductor mainly contains a fullerene derivative as described above.

According to the first proton conductor of the present invention, since the conductor mainly contains the fullerene derivative having a proton transfer capability, protons are easily transferred or conducted, even in a dry state, and further, the protons can exhibit a high conductivity in a wide temperature range (at least in a range of about 160° C. to −40° C.) that includes ordinary temperatures. While the first proton conductor of the present invention has a sufficient proton conductivity even in a dry state, it can also have a proton conductivity in a wet state. The moisture may come from the outside.

According to the first production method of the present invention, since the production method includes the steps of: producing a fullerene derivative by introducing functional groups as discussed and molding a substance comprising the fullerene derivative, the proton conductor can be efficiently produced having the above-described unique performance without use of any binder resin. The term "molding" means molding in a shape of film, pellet or the like. Therefore, compaction or filtration or other like techniques are preferably available for producing the proton conductor.

According to the first electrochemical device of the present invention, since the proton conductor is held between the first and second electrodes, the first electrochemical device can eliminate the need for a humidifier and the like which are necessary for known fuel cells that require moisture as a migration medium so as to enhance proton conductivity. Therefore, the device construction of the present invention has an advantageously smaller and more simplified construction.

The present invention also provides a second proton conductor that includes a polymer material in addition to the fullerene derivative as previously discussed.

The present invention also provides a second method of producing a proton conductor, including the steps of: producing a fullerene derivative by introducing functional groups as discussed above; and mixing the fullerene derivative with a polymer material and forming the mixture into a desired shape, such as, a thin film.

The present invention also provides a second electrochemical device including: a first electrode, a second electrode, and a proton conductor held between the electrodes, wherein the proton conductor mainly contains a fullerene derivative as previously discussed, and a polymer material.

According to the second proton conductor of the present invention, since the conductor contains the fullerene derivative and a polymer material, it can exhibit not only an effect (high proton conductivity) comparable to that of the first proton conductor, but also a film formation ability unlike the first proton conductor that only contains the fullerene derivative. The second proton conductor, thus, can be effectively used as a thin film having a high strength, a gas permeation preventive ability, and a high proton conductivity.

According to the second production method of the present invention, since the method includes the steps of: producing a fullerene derivative, and mixing the fullerene derivative with a polymer material thereby molding the mixture into a desired shape, such as, a thin film, it can efficiently produce the proton conductor having the above unique performance in the form of a thin film. The term "molding" means molding in a desired shape by squeezing-out, compacting, coating or the like as further detailed above.

According to the second electrochemical device of the present invention, since the proton conductor that contains the fullerene derivative is held between the first and second electrodes, the second electrochemical device can exhibit an effect comparable to that of the first electrochemical device, since the proton conductor also contains the polymer material, the second electrochemical device can exhibit the same desirable effects as the second proton conductor.

The present invention also provides a third proton conductor that includes a carbon cluster derivative which has a number of functional groups so as to be capable of transferring protons between the functional groups of the carbon cluster derivative. The carbon cluster derivative includes a cluster or a plurality of clusters as its base material. The clusters each mainly or substantially contain a number of carbon atoms, preferably, on order of several to several hundred carbon atoms.

The present invention also provides a third method of producing a proton conductor, including the steps of: producing clusters of carbon atoms by an arc discharge method using a carbon-based electrode; and subjecting the carbon powder of the clusters to acid treatment or the like, to introduce functional groups to the carbon powder so as to form the carbon cluster derivative that is capable of transferring protons as previously discussed.

The present invention also provides a third electrochemical device including: a first electrode, a second electrode, and a proton conductor held between the electrodes, wherein the proton conductor mainly contains a carbon cluster derivative obtained by introducing functional groups to a cluster or a number of clusters that are the base material of the carbon cluster derivative as discussed.

The present invention has uniquely discovered that it is required to form proton conductive paths (migration sites or channels) in the carbonaceous material of the proton conductor as much as possible for imparting a good proton conductivity to the proton conductor. To meet such a requirement, it is necessary to introduce two or more functional groups that are capable of transferring protons, for example, on a surface of each of the clusters or a number of clusters, such as, a number of carbon clusters of the carbon cluster derivative. The carbon cluster is preferably made as small as possible. In this way, the carbon clusters can exhibit a desirable proton conductivity when combined in bulk to form the carbon cluster derivative of the proton conductor.

The cluster of the present invention generally means an aggregate in which atoms on order of several hundred are bonded or aggregated to each other. The aggregate improves the proton conductivity and also ensures a sufficient film strength while maintaining its chemical property to be thereby easily formed into a layer. The "cluster mainly or substantially containing carbon atoms" means an aggregate in which a number of carbon atoms, preferably on order of several hundred, are closely bonded to each other irrespective of the typically known molecular bonding that occurs between carbon atoms. Although this type of cluster contains a large number of carbon atoms, it is not limited only to carbon atoms and may include a variety of other atoms within its aggregate structure. Hereinafter, a cluster aggregate that contains a large number of carbon atoms—yet may also contain other atoms—is referred to as a "carbon cluster".

According to the third proton conductor of the present invention, the conductor mainly contains a carbon cluster derivative that has a chemical structure which allows protons to be easily transferred as discussed, even in a dry state, with a result that the third proton conductor can exhibit effects, such as, a desirable proton conductivity, which are similar to those of the first proton conductor. In addition, the carbon cluster derivative may include clusters or carbon clusters that contain a variety of different carbonaceous materials—examples of which are discussed below.

According to the third production method of the present invention, since the production method produces the clusters or carbon clusters by making use of the arc discharge method using a carbon based electrode and subjects the carbon clusters or clusters to at least acid treatment, it can efficiently produce the carbon cluster derivative of the proton conductor having the above-described unique properties at a low cost.

According to the third electrochemical device of the present invention, since the above proton conductor is held between the first and second electrodes, the third electrochemical device can exhibit effects similar to those of the first electrochemical device.

The present invention also provides a fourth proton conductor mainly containing a tubular carbonaceous material derivative that includes functional groups so as to be capable of transferring protons between the functional groups of the tubular carbonaceous material derivative in a similar fashion as protons are transferred on the proton conductor of the previously discussed embodiments, namely the first, second, and third proton conductors, production methods, and electrochemical devices thereof.

The present invention also provides a fourth method of producing a proton conductor that includes the steps of preparing a halogenated or non-halogenated tubular carbonaceous material as a raw material; and introducing functional groups onto the tubular carbonaceous material by subjecting the material to hydrolysis and/or acid treatment or plasma treatment so as to form the tubular carbonaceous material derivative.

The present invention also provides a fourth electrochemical device that includes a first electrode, a second electrode and a proton conductor that is positioned between the electrodes wherein the proton conductor mainly contains the tubular carbonaceous material derivative as previously discussed.

The tubular carbonaceous material derivative of the fourth embodiments exhibits similar desirable and advantageous properties as the proton conductor materials of the previously discussed embodiments, such as, these materials provide a medium through which protons migrate easily even under a dry state.

As previously discussed, the principal reason why the proton conductors of the present invention can exhibit such an excellent proton migration characteristic is that a large number of functional groups, such as, hydroxyl and —$OSO_3H$ groups, can be introduced to the tubular carbonaceous material of the tubular carbonaceous material derivatives.

The tubular carbonaceous material derivative of the fourth embodiment includes a carbon nano-tube (CNT) material, such as, a single wall carbon nano-tube material (SWCNT), a multi-wall carbon nano-tube material (MWCNT), a carbon nano-fiber material (CNF), or other like tubular carbonaceous material.

The tubular carbonaceous material is characterized in that a ratio of an axial length to a diameter of the tubular carbonaceous material is very large, and further the tubular carbonaceous molecules of this material are entangled in a complicated form or structure that is inherent to this kind of material. Accordingly, a large number of the functional groups can be introduced onto the surfaces of the tubular carbonaceous molecules of these carbonaceous materials (see FIGS. 20–22).

In particular, the tubular carbonaceous material of the fourth embodiment makes it possible to increase the number of stable proton sites from which the protons can singly migrate without the use of carrier molecules, such as, water, and to continuously distribute the stable proton sites over an entire region of the material.

The fourth method of producing a proton conductor that includes a tubular carbonaceous material derivative as discussed can be easily produced by preparing a halogenated or non-halogenated tubular carbonaceous material; then subjecting the material to an acid treatment or hydrolysis and an acid treatment or a plasma treatment. This material can then be easily formed into a film by dispersing the tubular carbonaceous material derivative within a liquid such as water and then filtering the dispersion of the derivative.

The film thus formed, in which tubular molecules are entangled, has a large strength, a high stability, and a good proton conductivity. When used for a general electrochemical device, the proton conductor is required to be configured as an aggregate of the tubular carbonaceous material derivative, and in particular, when used for a fuel cell, the proton conductor is required to be configured as a thin film having a high stability, a high density, a large strength, and a good proton conductivity. Accordingly, it is apparent that the film of the tubular carbonaceous material derivative according to the present invention is particularly suitable for such an application.

The film can then be used for an electrochemical device wherein the proton conductor of the electrochemical device is formed of the film. In this way, the film is mounted as the proton conductor between the first and second electrodes of the electrochemical device such that it is possible to maintain desirable proton conductivity for a long period of time without the need of using any external migration medium, such as, moisture so as to enhance proton conductivity.

DESCRIPTION OF THE DRAWINGS

FIGS. 2A, 2B, and 2C illustrate further examples of molecules of the fullerene derivative of the present invention, wherein FIGS. 2A–2C show a fullerene derivative that includes fullerene molecules which contain —OH groups, —$OSO_3H$ groups, and Z groups, respectively;

FIGS. 3A and 3B illustrate examples of fullerene molecules;

DETAILED DESCRIPTION OF THE PREFERRED EMBODIMENTS

Hereinafter, embodiments of the present invention will be described in detail with reference to the accompanying drawings.

A first proton conductor according to a first embodiment of the present invention mainly contains a fullerene derivative that includes a number of functional groups so as to be capable of transferring protons between the functional groups of the fullerene derivative.

According to this embodiment, the kind of fullerene molecule or molecules used as a base material for the fullerene derivative to which functional groups capable of transferring protons are introduced is not particularly limited insofar as the fullerene molecules are characterized as a spherical carbon cluster or carbon clusters that generally include the $C_{36}$, $C_{60}$ (see FIG. 3A), $C_{70}$ (see FIG. 3B), $C_{76}$, $C_{78}$, $C_{80}$, $C_{82}$, and $C_{84}$ fullerene molecules. It should be noted that a mixture of these fullerene molecules or other like fullerene molecules may also be used as the base material of the fullerene derivative.

The fullerene molecule was found in the mass spectrum of a beam of carbon cluster created by laser abrasion of graphite in 1985. (H. W. Kroto, J. R. Heath, S. C. O'Brien, R. F. Curl and R. E. Smalley, Nature, 318, 162 (1985)). The method of producing the fullerene molecules by arc discharge of a carbon electrode was established five years later in 1990. Ever since the establishment of the practical production method, the fullerene molecules have become a focus of attention as a carbon-based semiconductor material or the like.

The present invention has uniquely and advantageously examined the proton conductivities of derivatives of these fullerene molecules, and found that a polyhydroxylated fullerene obtained by introducing hydroxyl groups to a number of carbon atoms of a fullerene molecule or molecules exhibits, even in a dry state, a high proton conductivity in a wide temperature range including an ordinary temperature region, that is, a temperature range from less than the freezing point of water to more than the boiling point of water (at least $-40°$ C. to $160°$ C.), and further found that the proton conductivity becomes higher when hydrogensulfate ester groups, namely, $-OSO_3H$ groups, are introduced, in place of the hydroxyl groups, to the fullerene molecule or molecules.

Figure 1B:
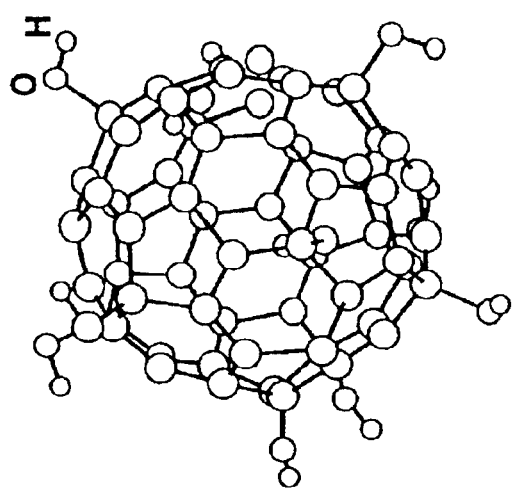
FIGS. 1A and 1B are views showing a structure of a polyhydroxylated fullerene molecule as examples of molecules of a fullerene derivative of the present invention.
Figure 1A:
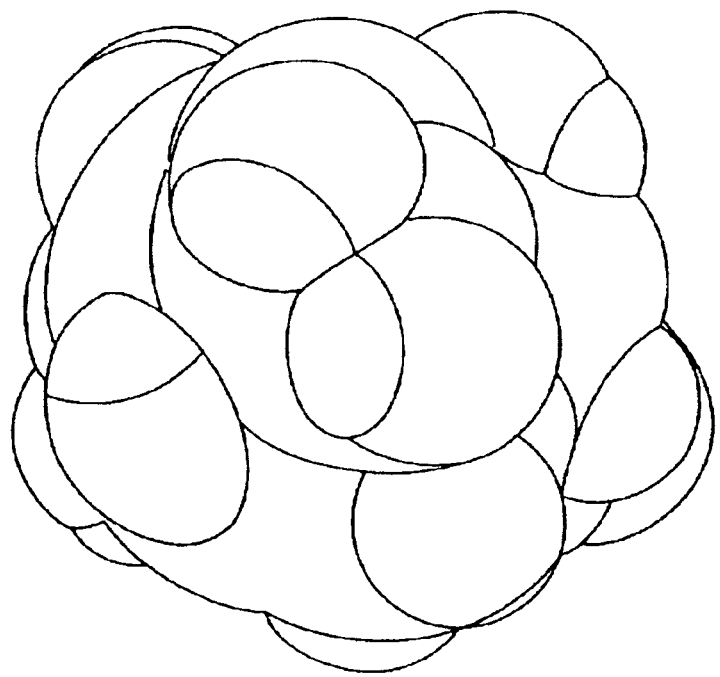

To be more specific, the polyhydroxylated fullerene or fullernol is a generic name of a fullerene-based compound that has a structure in which a plurality of hydroxyl groups are added to the fullerene molecule or molecules as shown in FIGS. 1A and 1B. Of course, with respect to the number, arrangement, and the like of the hydroxyl groups of the fullerene molecule, some variations can be considered. The first synthesis example of the polyhydroxylated fullerene has been reported by Chiang, et al. in 1992. (L. Y. Chiang, J. W. Swirczewski, C. S. Hsu, S. K. Chowdhury, S. Cameron and K. Creengan, J. Chem. Soc, Chem. Commun., 1791 (1992)). Since this report, the polyhydroxylated fullerene that contains a specific amount or more of the hydroxyl groups has become a focus of attention, particularly, in terms of its water-soluble ability, and has been studied mainly in the biotechnological field.

Figure 2A:
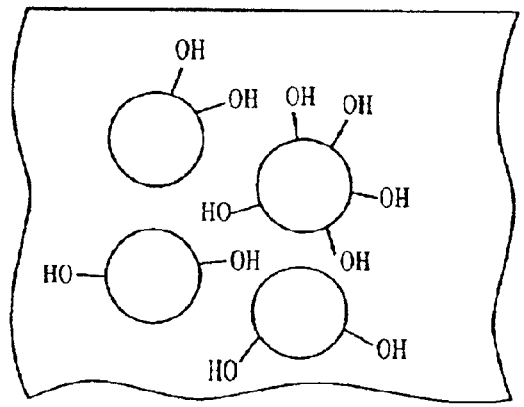

In an embodiment, the present invention has newly discovered that a fullerene derivative can be formed from an aggregate of the polyhydroxylated fullerene molecules, as schematically shown in FIG. 2A, in which the hydroxyl groups of each of these molecules adjacent to each other (in the figure, ○ designates the polyhydroxylated fullerene molecule) act on each other, thereby exhibiting a high proton conductivity (that is, a high transferability of $H^+$ between the phenolic hydroxyl groups of the polyhydroxylated fullerene molecule or molecules) within the bulk or aggregate of the polyhydroxylated fullerene molecules.

Figure 2B:
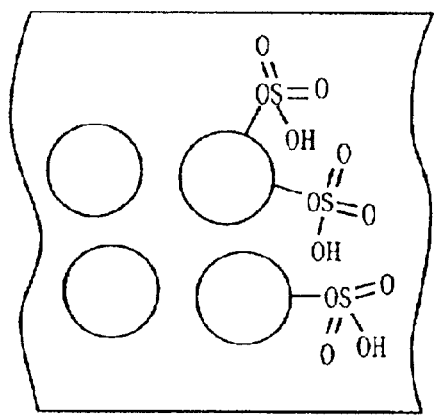

As the first proton conductor in this embodiment, the aggregate of fullerene molecules wherein each or a number of the molecules have a plurality of $-OSO_3H$ groups may be used in place of the aggregate of polyhydroxylated fullerene molecules as previously discussed. The fullerene-based compound in which the OH groups are replaced with the $-OSO_3H$ groups as show in FIG. 2B, that is, a hydrogensulfate-esterificated fullerenol (polyhydroxyl hydrogen sulfated fullerene) was reported by Chiang, et al. in 1994. (L. Y. Chiang, L. Y. Wang, J. W. Swirczewski, S. Soled and S. Cameron, J. Org. Chem. 59, 3960 (1994)). The molecules of polyhydroxyl hydrogen sulfated fullerene may contain only the $-OSO_3H$ groups or contain a number of the $-OSO_3H$ groups and a number of the hydroxyl groups.

In the case of preparing the fullerene derivative of the present invention, an aggregate of a large number of fullerene derivative molecules that contain the hydroxyl groups or —OSO$_3$H groups or combinations thereof is prepared. Since the protons derived from a large amount of hydroxyl groups or —OSO$_3$H groups or combinations thereof that are originally contained in the molecules directly migrate, the proton conductivity of the bulk or aggregate of these fullerene molecules is self-determined without the need of entrapment of hydrogen resulting from steam molecules or protons from an atmosphere and also without the need of supply of water from an external environment, particularly, the need of absorption of water or the like from atmospheric air. In other words, the proton conductivity of the aggregate of the fullerene molecules that contain the functional groups is not limited by the environmental atmosphere. Further, the fullerene molecules as the base material of the fullerene derivative particularly have an electrophilic property, which property may allow not only the —OSO$_3$H groups having a high acidity but also the hydroxyl groups to largely promote the ionization of hydrogen. This is one of the reasons why the first proton conductor of an embodiment of the present invention exhibits an excellent proton conductivity.

According to the first proton conductor of an embodiment of the present invention, since a large amount of hydroxyl groups or —OSO$_3$H groups or combinations thereof can be introduced to each or a number of the fullerene molecules of the fullerene derivative, the numerical density of protons related to conductivity per unit volume of the conductor becomes very large. This is another reason why the first proton conductor in this embodiment exhibits an effective conductivity.

Since the fullerene molecule or molecules of the fullerene derivative of the first proton conductor in this embodiment are mostly or substantially composed of carbon atoms, the fullerene derivative is light in weight, not easily decomposed, and relatively pure, that is, relatively free of contaminants that may negatively impact its desirable proton conductivity properties. In addition, the cost that is required to produce the fullerene derivative has been rapidly lowered. Accordingly, the fullerene may be regarded as a desirable carbonaceous material based on resource, environmental, economic or other desirable considerations as previously discussed.

As a result of the present invention, it is further discovered that the functional groups, as discussed above, are not limited to the hydroxyl or —OSO$_3$H functional groups.

To be more specific, the functional groups can be expressed by a chemical formula of —XH where X is an arbitrary atom or atomic group having a bivalent bond, and further the group can be expressed by a chemical formula of —OH or —YOH where Y is an arbitrary atom or atomic group having a bivalent bond. In particular, the functional groups are preferably at least one of the —OH and —OSO$_3$H, and —COOH, —SO$_3$H and —OPO(OH)$_3$ functional groups.

Figure 2C:
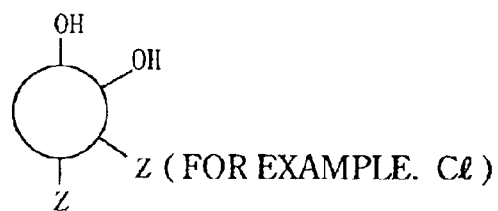

According to this embodiment, electron attractive groups, such as, nitro groups, carbonyl groups and carboxyl groups, nitrile groups, alkyl halide groups or halogen atoms (fluorine or chlorine atoms) may be preferably introduced together with the functional groups, to carbon atoms of the fullerene molecule or molecules. FIG. 2C shows a fullerene molecule to which Z is introduced in addition to —OH, where Z represents at least one of the —NO$_2$, —CN, —F, —Cl, —COOR, —CHO, —COR, —CF$_3$, or —SO$_3$CF$_3$ (R is an alkyl group) electron attractive groups. With the presence of the electron attractive groups in addition to the functional groups, it is easy for protons to be released from the functional groups and to be transferred between the functional groups by the electron attractive effect of the electron attractive groups.

According to this embodiment, the number of the functional groups can be freely selected insofar as it is less than the number of the carbon atoms of the fullerene molecule or molecules, and preferably may include 5 functional groups or more. To keep the π electron characteristic of the fullerene molecule for achieving the effective electron attractive ability, the number of functional groups is more preferably half or less than half of the number of carbon atoms of a fullerene molecule or molecules.

To synthesize the above-described fullerene derivative used for the first proton conductor of an embodiment, as will be described later with reference to examples, desired functional groups may be introduced to carbon atoms of each or a number of the fullerene molecules of the fullerene derivative by subjecting a powder of the fullerene molecules to known treatments, such as, acid treatment and hydrolysis suitably in combination.

After treatment, the powder of the fullerene derivative thus obtained can be compacted into a desired shape, for example, into a pellet. The compacting of the powder can be performed without use of any binder, which is effective to enhance the proton conductivity and to reduce the weight of the proton conductor, resulting in a molded material that substantially contains the fullerene derivative.

The first proton conductor in this embodiment can be suitably used for various electrochemical devices. For example, the present invention can be preferably applied to an electrochemical device having a basic structure that includes first and second electrodes and a proton conductor held therebetween, wherein the proton conductor is configured as the first proton conductor in this embodiment.

To be more specific, the first proton conductor in this embodiment can be preferably applied to an electrochemical device in which at least one of the first and second electrodes is a gas electrode, or an electrochemical device in which at least one of the first and second electrodes is an active electrode.

Hereinafter, an example in which the first proton conductor in this embodiment is applied to a fuel cell will be described.

Figure 8:
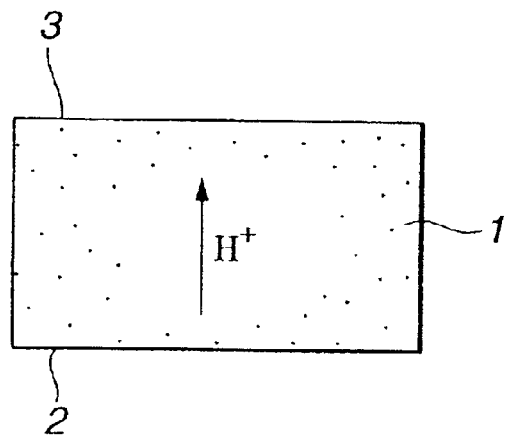
FIG. 8 is a schematic view of an example of a proton conductor of the present invention.

FIG. 8 is a schematic view showing the proton conductance of the fuel cell in which a proton conducting portion 1 is held between a first electrode (for example, hydrogen electrode) 1 and a second electrode (for example, oxygen electrode) 3, wherein protons dissociated or transferred in the proton conducting portion 1 migrate from the first electrode 2 side to the second electrode 3 side along the direction shown by an arrow in FIG. 8.

Figure 9:
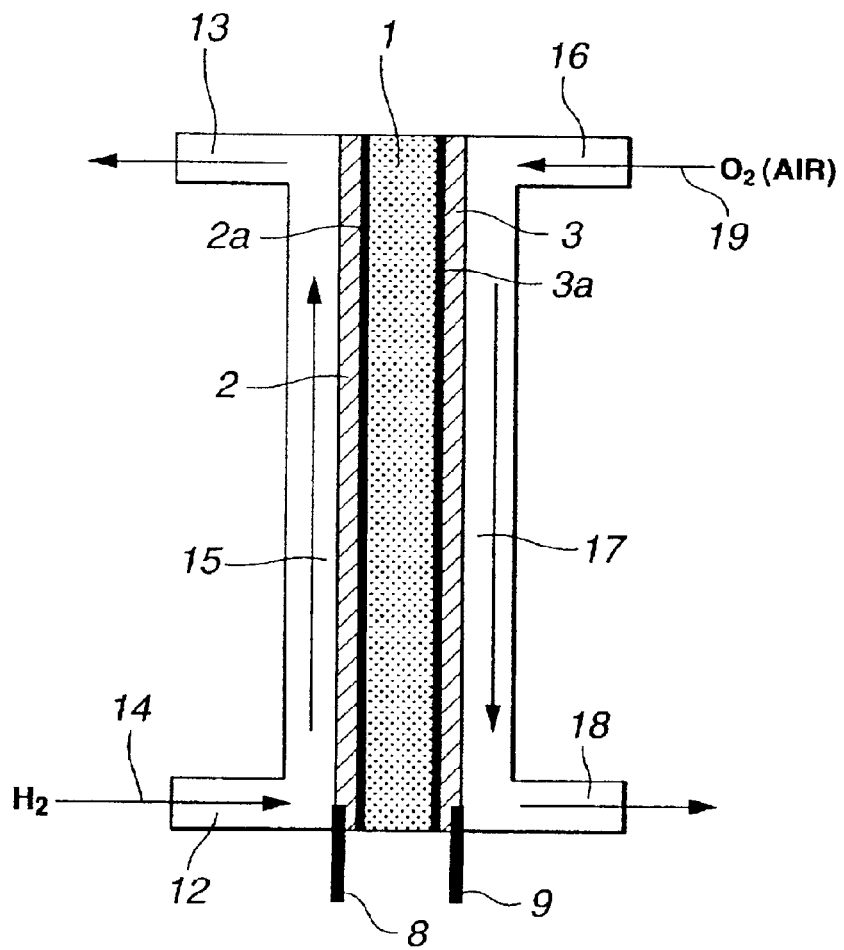
FIG. 9 is a sectional view showing a fuel cell that employs a proton conductor of the present invention.

FIG. 9 is a schematic view showing one example of the fuel cell using the first proton conductor in this embodiment. The fuel cell is configured such that a negative electrode (fuel electrode or hydrogen electrode) 2 to or in which a catalyst 2a is closely overlapped or dispersed and which has a terminal 8 faces to a positive electrode (oxygen electrode) 3 to or in which a catalyst 3a is closely overlapped or dispersed and which has a terminal 9, and a proton conducting portion 1 is held therebetween. Upon use of the fuel cell, hydrogen is supplied from an inlet 12 on the negative electrode 2 side, and is discharged from an outlet 13 (which is sometimes not provided) on the negative electrode 2 side. During a period in which fuel (H$_2$) 14 passes through a flow passage 15, protons are generated. The protons migrate together with protons generated in the proton conducting portion 1, onto the positive electrode 3 side, and react with oxygen (air) 19, which has been supplied in a flow passage 17 from an inlet 16 and flows toward an outlet 18, to generate a desired electromotive force.

According to the fuel cell having the above configuration, since the protons generated in the proton conducting portion 1 migrate, together with the protons supplied from the negative electrode 2 side, onto the positive electrode 3 side, the proton conductivity becomes higher. As a result, it is possible to eliminate the need of any humidifier or other water source or other external migration medium and hence to simplify the configuration of the system and reduce the weight of the system.

A second embodiment of the present invention will be described below. The second embodiment is different from the first embodiment in that the above-described fullerene derivative is used in combination with a polymer material. However, the proton conductor of the second embodiment essentially has the same proton conductivity features of the first embodiment.

A second proton conductor in this embodiment contains the above-described derivative and a polymer material.

The polymer material may be one kind or two kinds or more known polymers having a film formation ability. The content of the polymer material is generally 20 wt % or less. If the content is more than 20 wt %, the proton conductivity of the fullerene derivative may degrade.

Since the second proton conductor in this embodiment contains the fullerene derivative, it can exhibit a proton conductivity comparable to that of the first proton conductor of the first embodiment.

While the first proton conductor in the first embodiment containing only the fullerene derivative is used as a compacted powder as described above, the second proton conductor in this embodiment having a film formation ability derived from the polymer material can be used as a flexible proton conductive thin film having a large strength and a gas impermeable property. In general, the thickness of the proton conductive thin film is 300 μm or less.

The kind of polymer material is not particularly limited insofar as it does not obstruct the proton conductivity as much as possible (due to the reaction with the fullerene derivative or the like) and has a film formation ability, but may be generally selected from polymers having no electronic conductivity and exhibiting a good stability. Examples of these polymers may include polytetrafluoroethylene, polyvinylidene fluoride, and polyvinyl alcohol. The reason why polytetrafluoroethylene, polyvinylidene fluoride or polyvinyl alcohol are suitable for the second proton conductor in this embodiment will be described below.

The reason why polytetrafluoroethylene is suitable for the second proton conductor is that it has a good film formation ability. Even by adding polytetrafluoroethylene to the fullerene derivative in an amount smaller than that of another polymer material, it is possible to easily form a thin film of the second proton conductor having a large strength. The content of polytetrafluoroethylene includes 3 wt % or less, preferably, in a range of 0.5 to 1.5 wt %. By adding polytetrafluoroethylene to the fullerene derivative in an amount within the above range, the thin film of the second proton conductor has a thickness that ranges from 1 μm to 100 μm.

The reason why polyvinylidene fluoride or polyvinyl alcohol are suitable for the second proton conductor is that it is effective to form a proton conductive thin film having a good gas permeation preventive ability. The content of polyvinylidene fluoride or polyvinyl alcohol may range from 5 to 15 wt %. If the content of polyvinylidene fluoride or polyvinyl alcohol is less than the lower limit of the above range, there may occur an adverse effect exerted on the film formation.

The thin film of the second proton conductor in this embodiment may be obtained by using a known film formation technique, such as, extrusion molding.

The second proton conductor in this embodiment can be preferably applied to the electrochemical device to which the first proton conductor in the first embodiment is applied.

That is to say, in the electrochemical device to which the first embodiment is applied, in which the first proton conductor is held between the first and second electrodes, the first proton conductor may be replaced with the second proton conductor in this embodiment.

Figure 17:
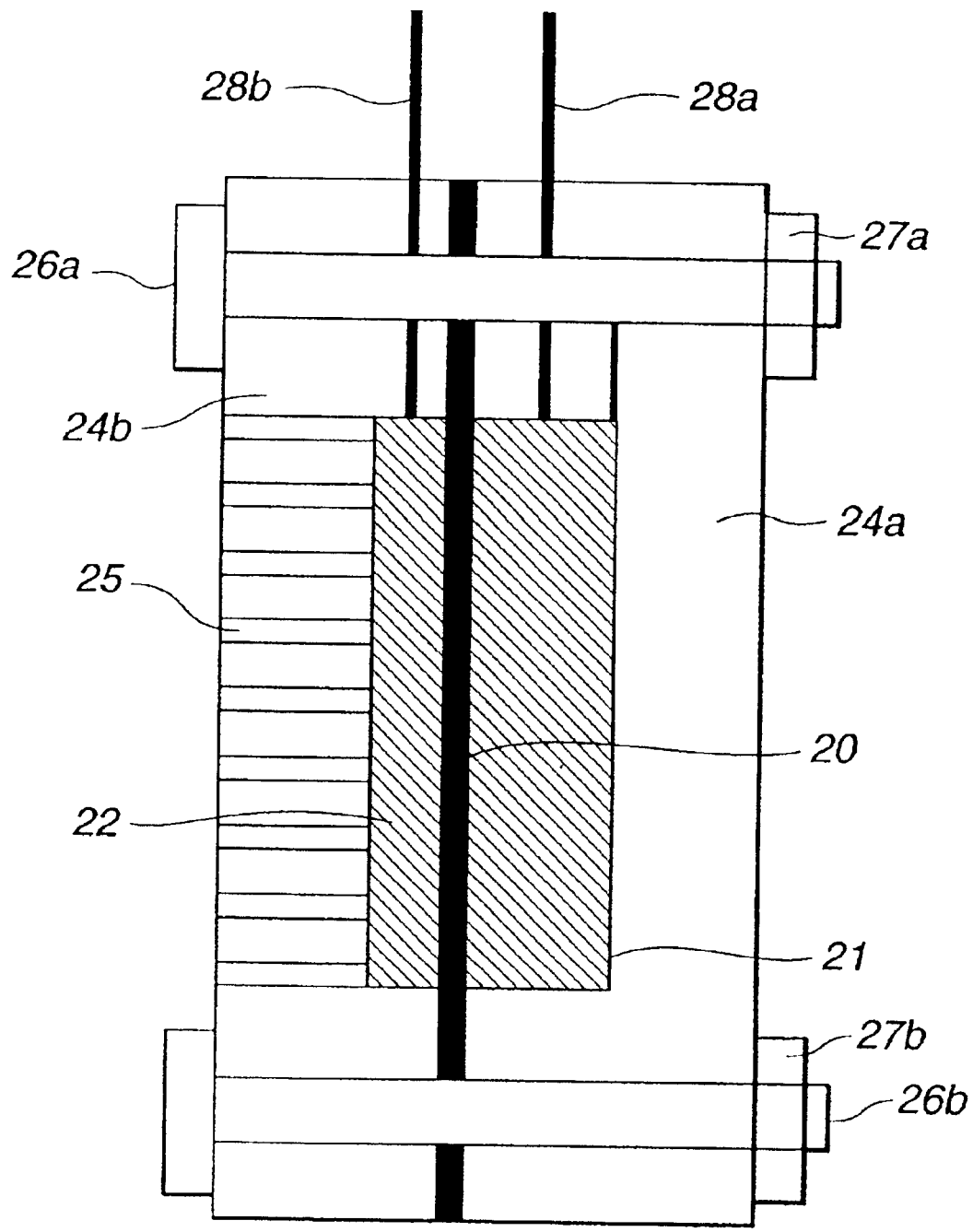
FIG. 17 is a sectional view of a hydrogen-air cell that employs a proton conductor of the present invention.

FIG. 17 is a schematic view showing a hydrogen-air cell to which the second proton conductor in this embodiment is applied. In this device, a hydrogen electrode 21 faces to an air electrode 22 with a proton conductor 20 formed into a thin film (configured as the second proton conductor) held therebetween, and the outsides of these electrodes 21 and 22 are held between a Teflon plate 24a and a Teflon plate 24b having a number of holes 25 and fixed thereto by way of bolts 26a and 26b and nuts 27a and 27b, wherein a hydrogen electrode lead 28a and an air electrode lead 28b extending from the electrodes 21 and 22 are extracted to the outside of the cell.

Figure 18:
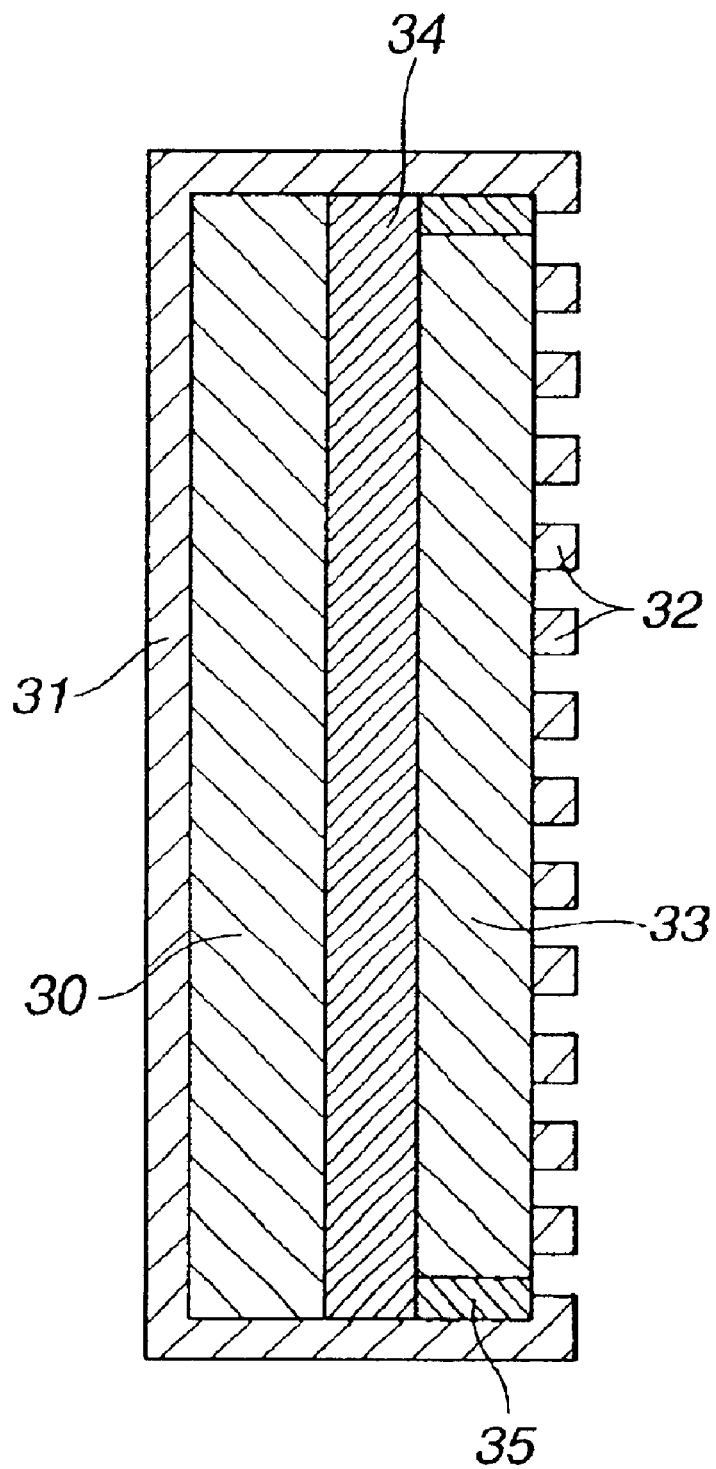
FIG. 18 is a schematic configuration view of another electrochemical device using the proton conductor of the present invention.

FIG. 18 is a schematic view showing an electrochemical device to which the second proton conductor in this embodiment is applied. Referring to FIG. 18, a proton conductor 34 (configured as the second proton conductor) is held between a negative electrode 31 having on its inner surface a negative electrode active material layer 30 and a positive electrode (gas electrode) 33 having on its outer surface a gas permeation support 32. The negative electrode active material may be configured as a hydrogen absorption alloy or a hydrogen absorption alloy supported by a carbon material such as a fullerene. The gas permeation support 32 may be configured as a porous carbon paper. The positive electrode 33 may be preferably formed by coating a paste of platinum supported by a powder of carbon. Gaps between the outer ends of the negative electrode 31 and the outer ends of the positive electrode 33 are blocked by gaskets 35. In this electrochemical device, charging can be performed by making water be present on the positive electrode 33 side.

Figure 19:
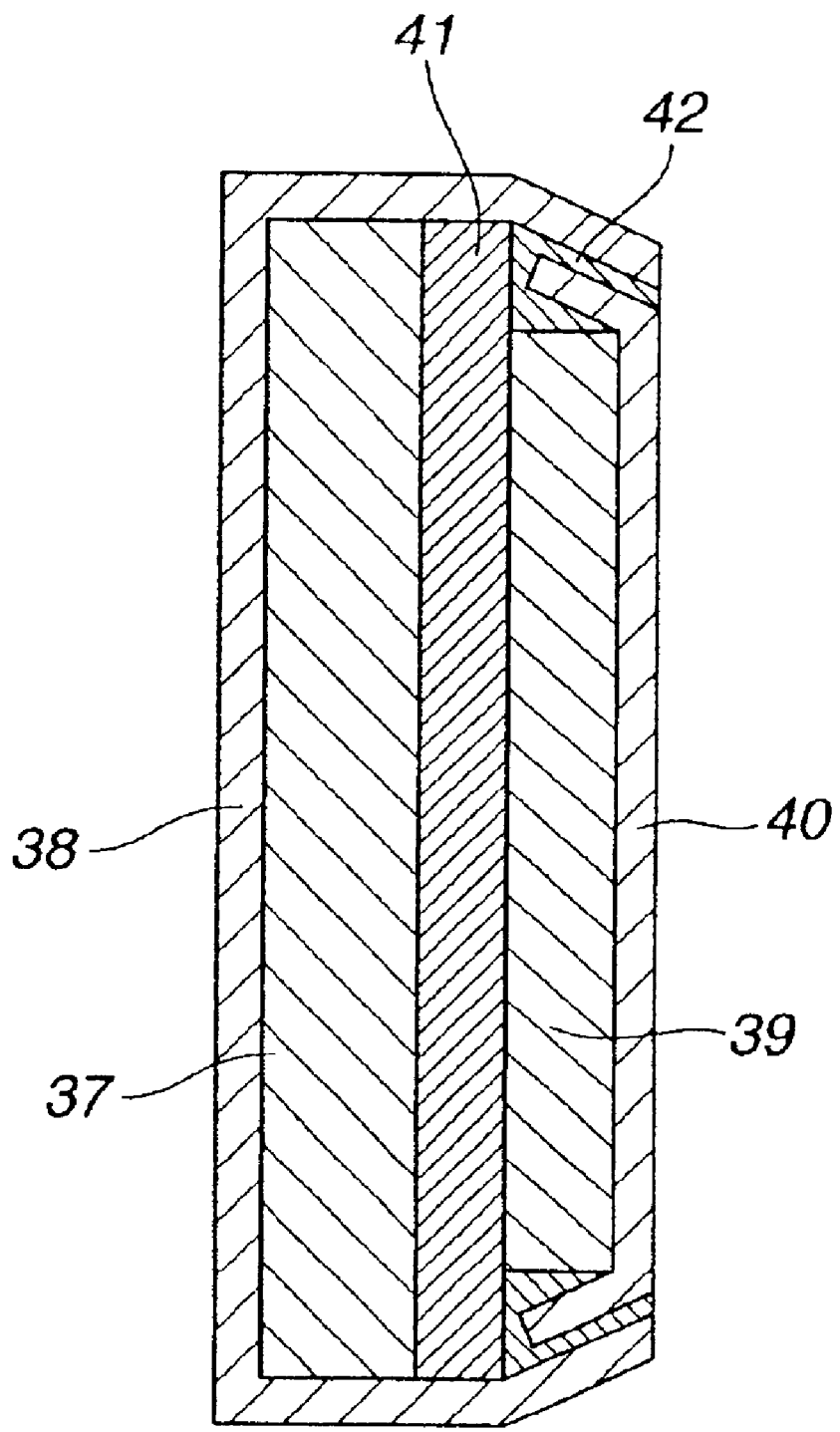
FIG. 19 is a schematic configuration view of a further electrochemical device using a proton conductor of the present invention.

FIG. 19 is a schematic view showing an electrochemical device to which the second proton conductor in this embodiment is applied. Referring to FIG. 19, a proton conductor 41 formed into a thin film (configured as the second proton conductor) is held between a negative electrode 38 having on its inner surface a negative electrode active material layer 37 and a positive electrode 40 having on its inner surface a positive electrode active material layer 39. The positive electrode active material is typically configured as a material mainly containing nickel hydroxide. Even in this electrochemical device, gaps between the outer ends of the negative electrode 38 and the outer ends of the positive electrode 40 are blocked with gaskets 42.

Each of the above-described electrochemical devices using the second proton conductor in this embodiment can exhibit a good proton conductive effect on the basis of the same mechanism as that of the electromechanical device using the first proton conductor in the first embodiment.

Further, since the second proton conductor containing the fullerene derivative in combination with the polymer material having a film formation ability, it can be formed into a thin film having a large strength and a small gas permeability, and therefore, it can exhibit a good proton conductivity.

A third embodiment of the present invention will be described below. The third embodiment is different from the first and second embodiments in that the proton conductor mainly contains a carbon cluster derivative or derivatives, but is the same or similar to the first and second embodiments in other ways, such as, the basic function of the proton conduction mechanism.

A third proton conductor in this embodiment mainly contains a carbon cluster derivative in which the functional groups are introduced to a number of carbon atoms of each of the clusters or carbon clusters which are used as a base material for the carbon cluster derivative.

The reason why the cluster(s) or carbon cluster(s) are used as the base material in this embodiment is that a large number of functional groups can be introduced to each cluster or carbon cluster via their respective carbon atoms. By introducing a large number of functional groups onto the cluster or carbon cluster, a desirable proton conductivity is achieved due to the fact that the introduction of a large number of functional groups significantly increases the acidity of the solid-state proton conductor. In addition, the increased acidity has little, if any, effect on the integrity of the chemical structure of the cluster or carbon cluster because atoms of the carbon cluster or cluster are so closely bonded to one another. With this closely-bonded chemical structure, the carbon cluster or cluster are superior in durability to other known carbonaceous or carbon-based materials, thereby resulting in a desirable film structure for the proton conductor.

The third proton conductor in this embodiment having the above configuration can exhibit, even in a dry state, a high proton conductivity similar to that of each of the first and second proton conductors in the first and second embodiments.

As defined above, the "carbon cluster" means an aggregate of up to several hundred carbon atoms that are closely bonded together irrespective of the carbon to carbon molecular-type bonding that exists between the carbon atoms. It should be noted that the carbon cluster, that is, an aggregate of that substantially contains carbon atoms is not necessarily entirely composed of carbon atoms. Various types of carbon clusters or aggregates of carbon atoms are shown in FIGS. 4 to 7. In these figures, the functional groups, for example, hydroxyl groups, are not shown.

Figure 4:
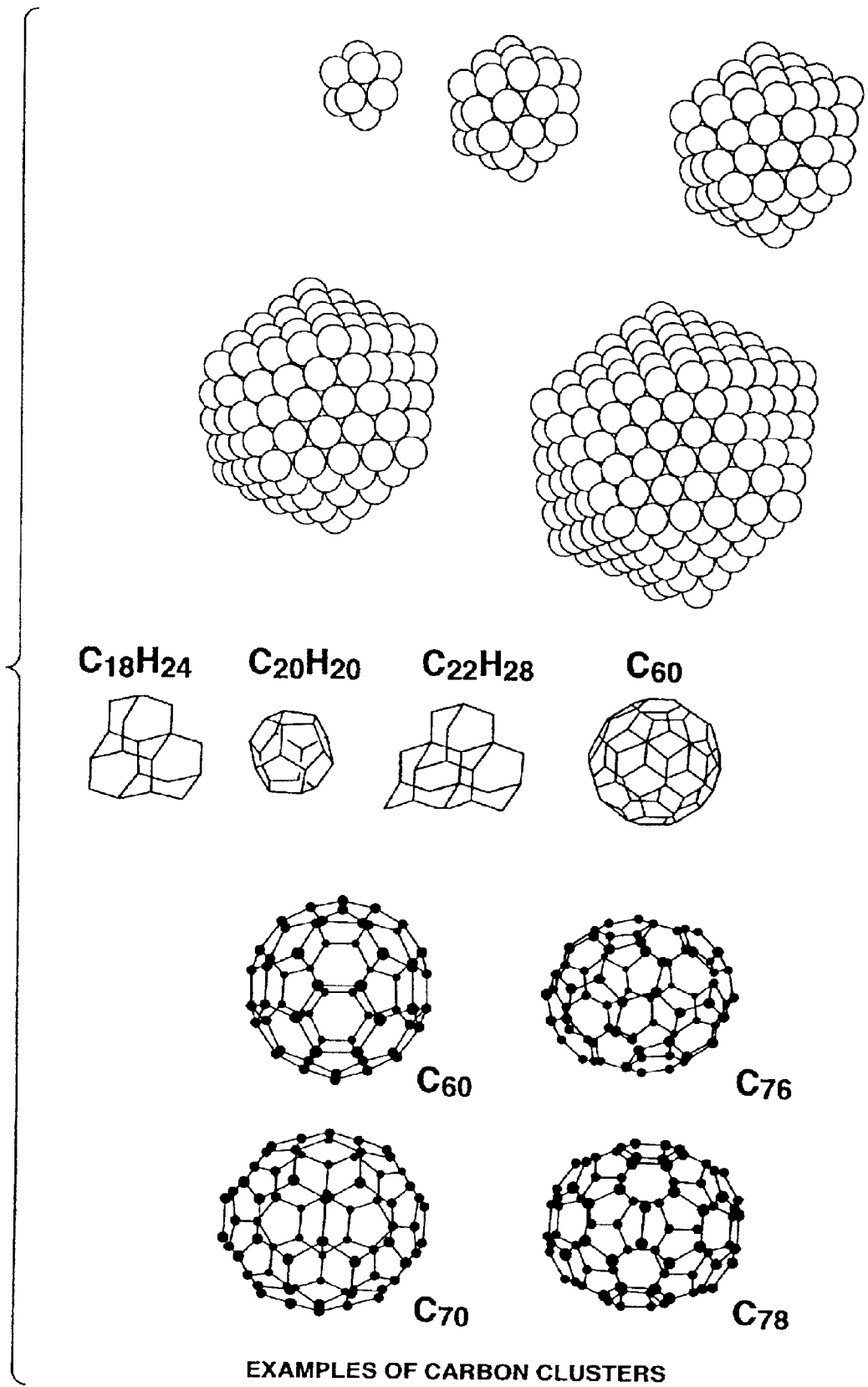
FIG. 4 shows examples of carbon clusters of a carbon cluster derivative of the third proton conductor of the present invention.
Figure 5:
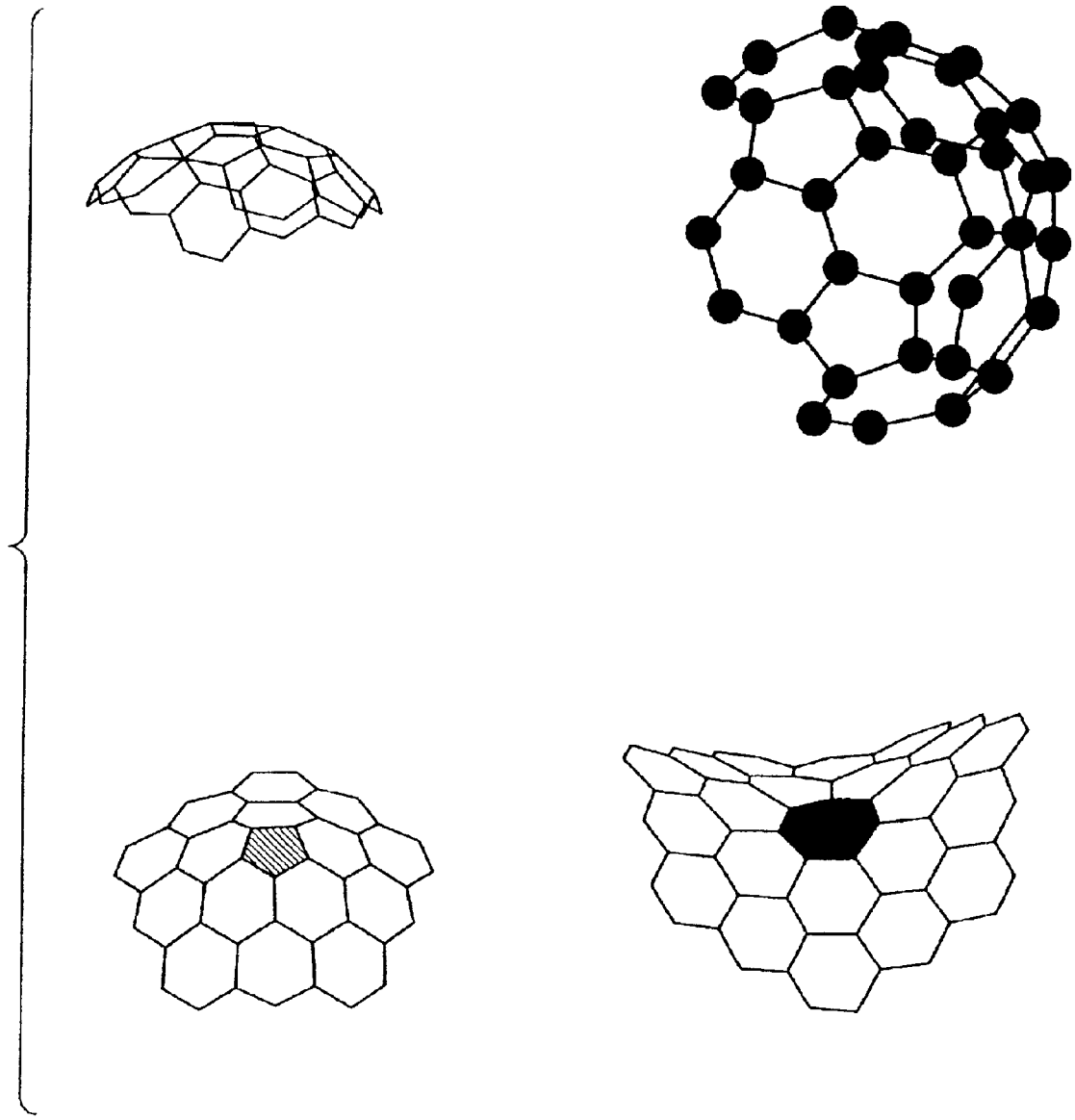
FIG. 5 shows further examples of carbon clusters that have partial fullerene structures.
Figure 6:
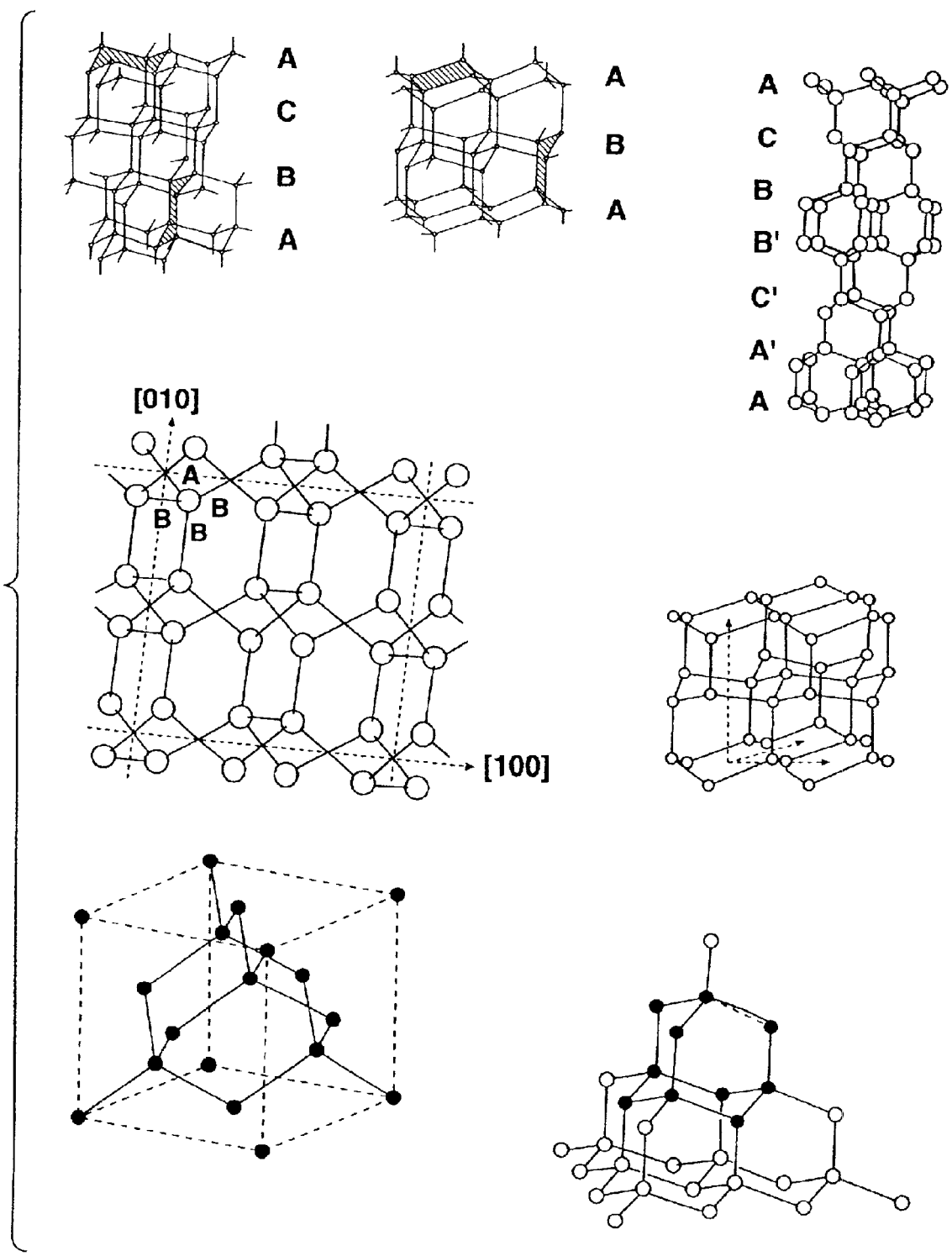
FIG. 6 shows still further examples of carbon clusters that have diamond structures.

FIG. 4 shows carbon clusters having spherical structures, spheroid structures, and planar structures similar thereto. FIG. 5 shows carbon clusters that have a partially open spherical structure which is characterized by an open end or ends. During production of the fullerene molecules by arc discharge, a large number of carbon clusters having a spherical structure with open ends are generated as sub-products. FIG. 6 shows carbon clusters each having a diamond structure, in which most of the carbon atoms of the carbon cluster are in the $SP^3$ bonding.

A carbon cluster material in which most of the carbon atoms are in the $SP^2$ bonding has a planar structure of graphite or has all or part of a fullerene or nano-tube structure. While it is not a problem that the carbon cluster material having a planar structure or graphite is used as the base or other component of the proton conductor, the proton conductivity should be larger than an electronic conductivity in total in the proton conductor.

On the contrary, a fullerene or nano-tube structure that has the $SP^2$ bonding often has no electronic conductivity because it also partially contains an element that exhibits the desirable $SP^3$ bonding. While some nano-tube structure has an electronic conductivity, the electronic conductivity can be vanished or lessened by introducing the above-mentioned functional groups to the nano-tube structure. Therefore, these carbon materials are desirable as the base of a proton conductor.

Figure 7:
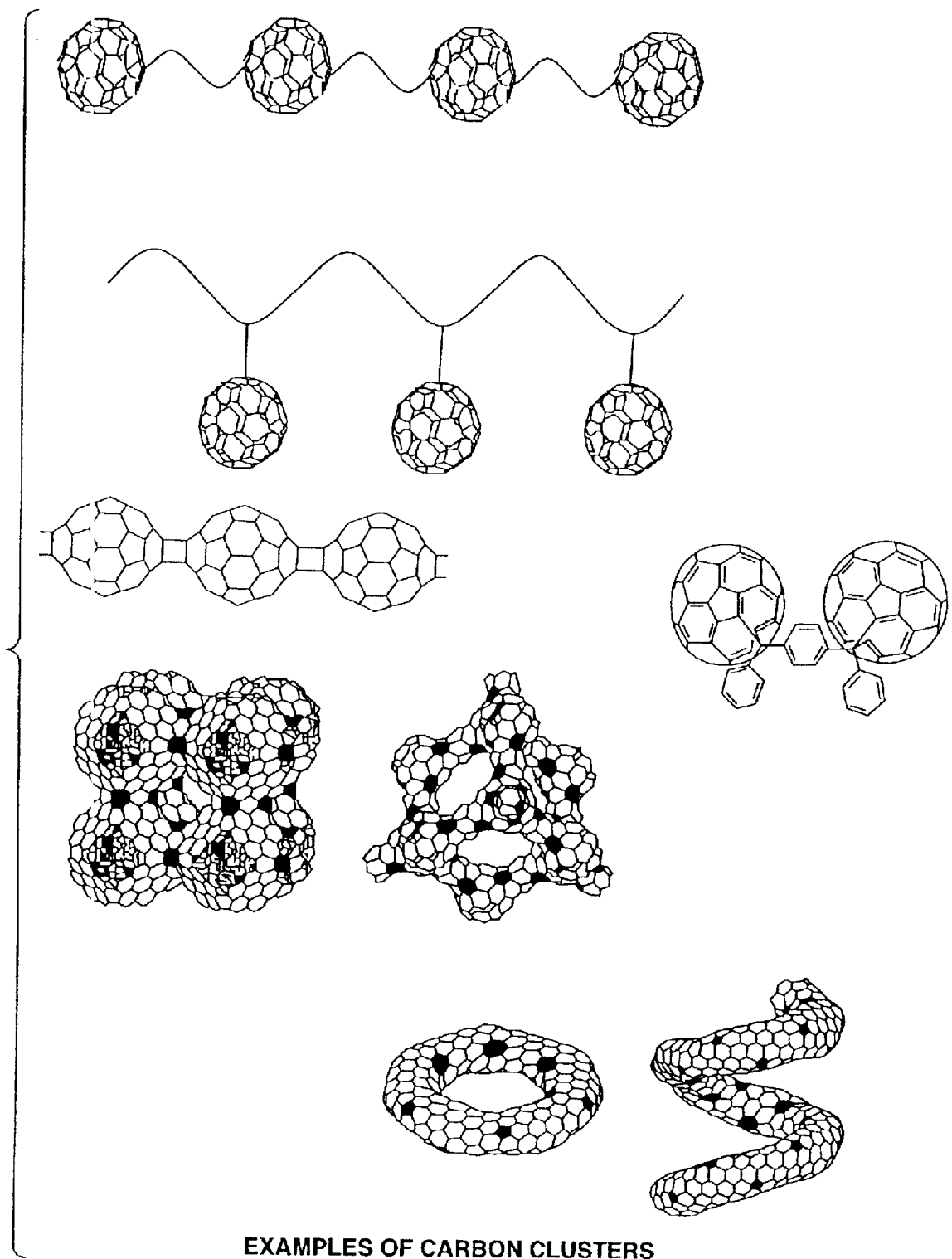
FIG. 7 shows additional examples of carbon clusters which are bonded to each other.

FIG. 7 shows carbon clusters which are bonded to each other. FIG. 7, thus, represents examples of carbon clusters that can be utilized to make the carbon cluster derivative of the proton conductor in an embodiment of the third proton conductor of the present invention.

To form the third proton conductor in this embodiment, it is required to introduce functional groups to the clusters or carbon clusters. Further, it may be desirable to further introduce electronic attractive groups to each of the clusters or carbon cluster. The functional groups may be introduced to each carbon cluster in accordance with the following production method.

According to the production method of the present invention, a carbon cluster derivative can be easily obtained by producing carbon clusters composed of carbon powder by arc discharge of a carbon-based electrode, and suitably subjecting the carbon clusters to acid treatment, typically using sulfuric acid and hydrolysis, and also subjected to sulfonation or phosphatation so as to introduce the sulfur and phosphorus-based functional groups, respectively.

The carbon cluster derivative can be compacted into a suitable shape, for example, into a pellet. According to the third proton conductor in this embodiment, the length of the major axis of each of the carbon clusters as the base of the carbon cluster derivatives of the proton conductors may be 100 nm or less, preferably, 100 Å or less, and the number of functional groups to be introduced therein may be preferably 2 or more.

The carbon cluster used for the third proton conductor may be of a cage structure at least part of which has open ends. The carbon clusters having such a case structure has a reactivity similar to that of a fullerene and also has a higher reactivity at its defect portions, that is, its open end portion or portions. Accordingly, the use of carbon clusters each having such a defect structure, that is, open end or ends, as the base of the third proton conductor can promote the introduction of functional groups by acid treatment or the like, that is, increase the introduction efficiency of the functional groups, thereby enhancing proton conductivity of the third proton conductor. Further, it is possible to synthesize a larger amount of carbon clusters as compared with fullerene molecules, and hence to produce the carbon clusters at a very low cost.

The kinds of functional groups and the electron attractive groups to be introduced to each of the carbon clusters as the base of the third proton conductor in this embodiment may be the same as those described above.

The third proton conductor in this embodiment can be suitably applied to various kinds of electrochemical devices, such as, a fuel cell. In this case, the configuration of the electrochemical device may be basically the same as that of the electromechanical device to which the first or second proton conductor in the first or second embodiment is applied except that the first or second proton conductor is replaced with the third proton conductor. Since the third proton conductor in this embodiment can also exhibit a good proton conductivity even in a dry state, it is possible to eliminate the need of providing any humidifier or other like instrument that produces an external migration, such as, water or steam, and hence to simplify the system configuration and reduce the weight of the system.

A fourth embodiment of the present invention will be described below in which the proton conductor includes a tubular carbonaceous material derivative. The tubular carbonaceous material derivative includes a tubular carbonaceous material as its base material. The tubular carbonaceous material includes a CNT material that is composed of nano-tube molecules that each have a diameter of about several nanometers or less, typically, in a range of 1 to 2 nanometers. In addition to the CNT material, the tubular carbonaceous material includes a CNF material that is composed of nano-fiber molecules which each have a diameter of several nanometers or more which may reach up to 1 mm. Further, it is known that the CNT material includes a single-wall carbon nano-tube (SWCNT) material that is composed of nano-tube molecules each being formed by a single layer or a multi-wall carbon nano-tube (MWCNT) that is composed of nano-tube molecules that are each formed of two or more layers which are concentrically overlapped.

Figure 24A:
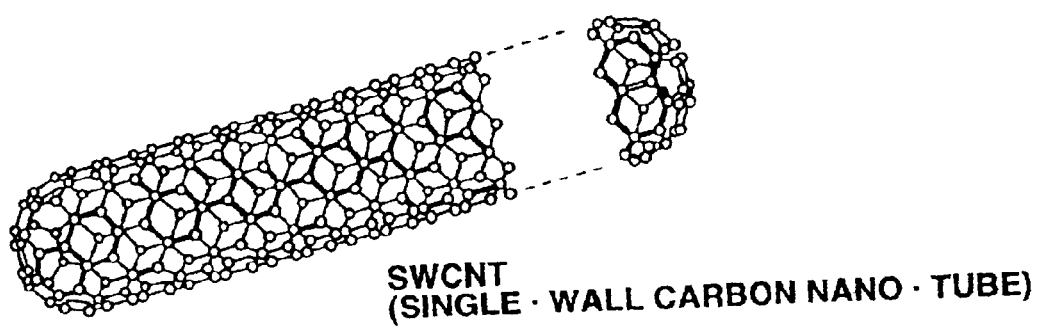
FIGS. 24A and 24B each illustrate examples of tubular carbonaceous materials of the present invention.
Figure 24B:
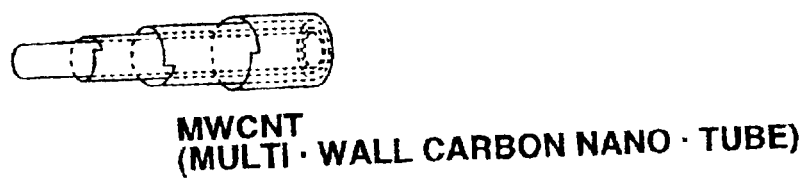

The configurations of the SWCNT and the MWCNT molecules are respectively shown in FIGS. 24A and 24B. In addition, the description of the CNT, the SWCNT and MWCNT materials are illustrative only wherein it is understood that the present invention is not limited to the same.

Figure 20:
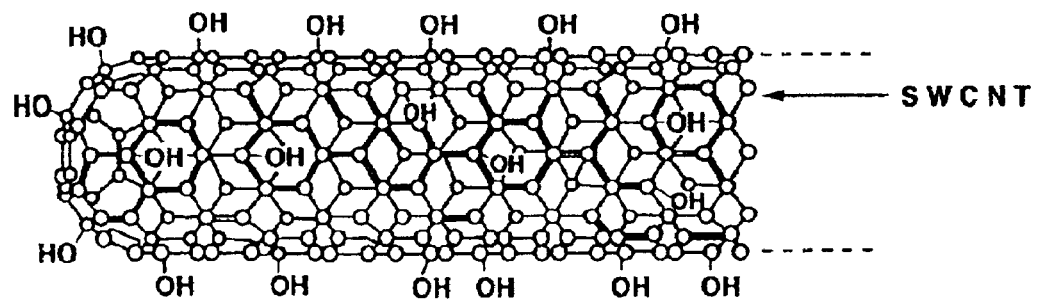
FIG. 20 illustrates a tubular carbonaceous material derivative of the present invention.
Figure 21:
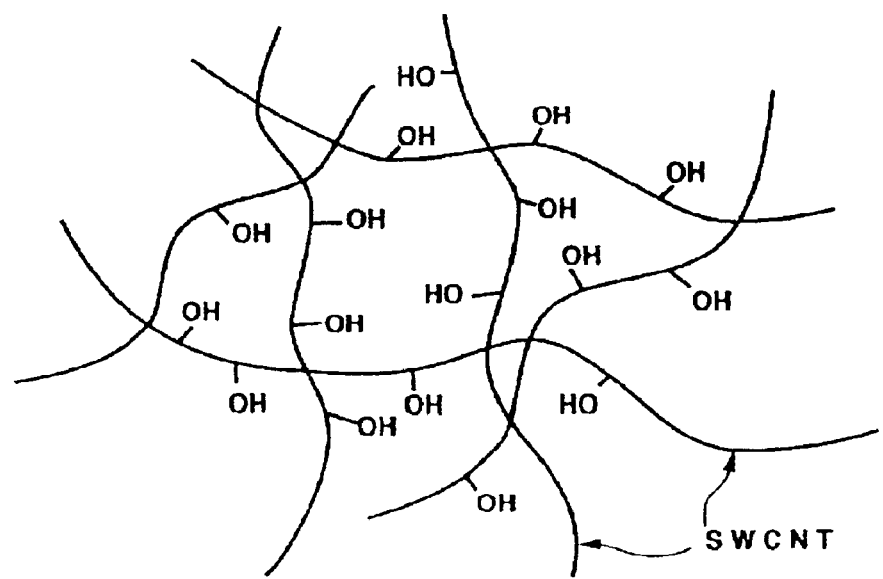
FIG. 21 further illustrates a number of tubular carbonaceous molecules of the tubular carbonaceous material derivative as shown in FIG. 20.
Figure 22:
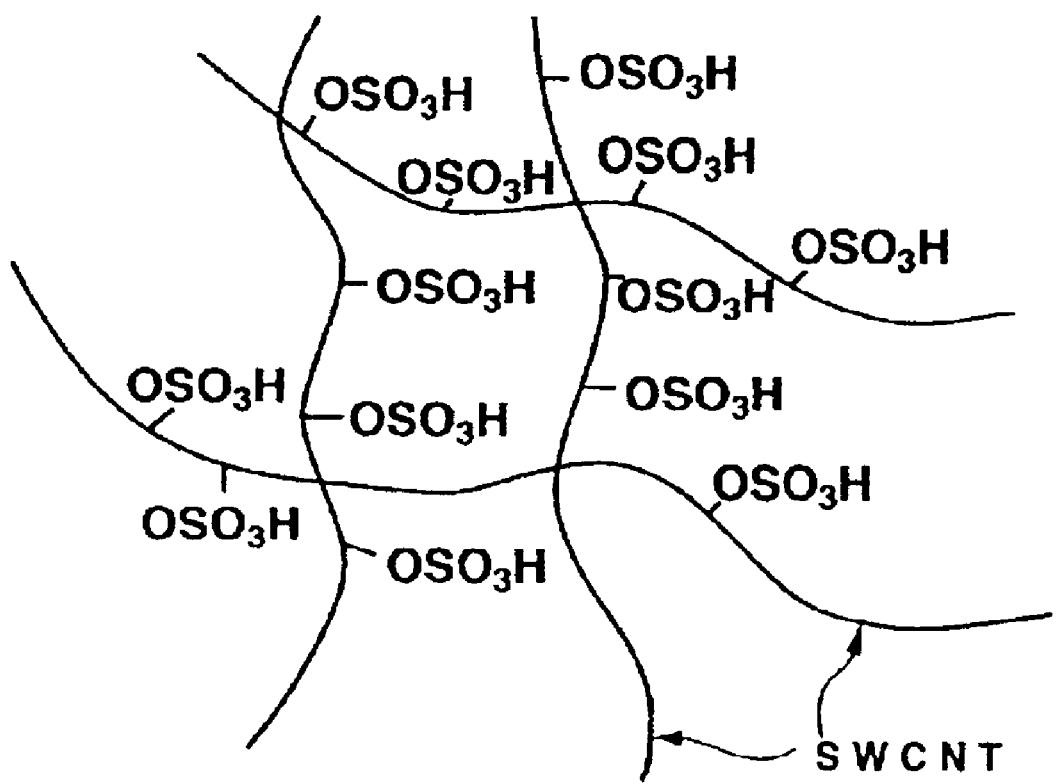
FIG. 22 illustrates another example of tubular carbonaceous molecules of a tubular carbonaceous material derivative.
Figure 23:
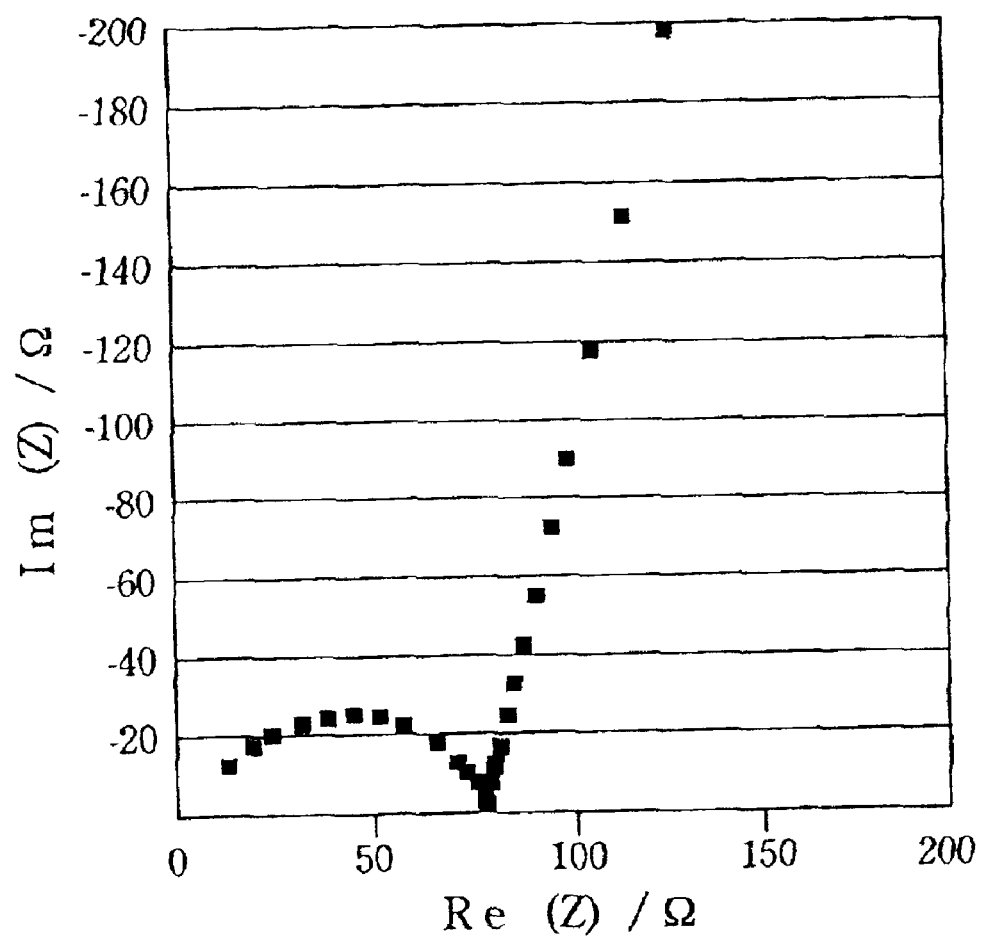
FIG. 23 is a graph that depicts the measuring a complex impedance of a film used in Inventive Example 10.

According to the fourth embodiment of the present invention, the functional groups that are introduced to the tubular carbonaceous materials in order to form the tubular carbonaceous material derivatives include the same functional groups as previously discussed in regards to the other embodiment of the present invention. As illustrated, FIG. 20 shows an example of a tubular carbonaceous material derivative that contains the hydroxyl functional groups. In addition, FIG. 21 illustrates a number of the tubular carbonaceous molecules or tubular molecules of the tubular carbonaceous material derivative as shown in FIG. 20. As well, FIG. 22 illustrates the tubular molecules of another tubular carbonaceous material derivative that includes the —OSO$_3$H functional groups. Such a tubular carbonaceous material derivative is produced by preparing a halogenated tubular carbonaceous material and subjecting the halogenated material to acid treatment by using sulfuric or nitric acid in order to introduce the —OSO$_3$H functional groups to the tubular carbonaceous material so as to form its derivative. In addition, a hydrolysis technique may be used to introduce hydroxyl groups instead of the —OSO$_3$H functional groups. If hydrolysis is used, an acid treatment may follow in order to substitute the hydroxyl groups for different functional groups, such as, the —OSO$_3$H functional groups.

If a non-halogenated tubular carbonaceous material is used as a base or raw material so as to form the tubular carbonaceous material derivative, this material may be subjected to acid treatment by using sulfuric or nitric acid as previously discussed. With regards to the halogenated tubular carbonaceous material, fluorine is preferably used.

The tubular carbonaceous material derivative can be produced not only by the above described wet method but also by the following dry method that utilizes plasma. In this method, a non-halogenated tubular carbonaceous material is subjected to plasma treatment in an oxygen gas and then subjected to further plasma treatment under a hydrogen gas in order to introduce the functional groups, typically, hydroxyl groups to the tubular molecules of the tubular carbonaceous material.

The invention has examined the proton conductivities of these tubular carbonaceous material derivatives and found that these materials provided a high proton conductivity under a varying temperature range that includes the ordinary temperature region, that is, a temperature ranging from less than the freezing point of water to more than the boiling point of water (at least −40° C. to 160° C. The present invention has further discovered that the proton conductivity is higher for tubular carbonaceous material derivatives that include the hydrogen sulfate as their groups in place of the hydroxyl groups.

In particular, the polyhydroxylated SWCNT material is a generic name of a derivative that has a structure in which a plurality of hydroxyl groups are added to a number of tubular molecules so as to form the SWCNT material as illustrated in FIG. 20. Of course, with respect to the number, arrangement and the like of the hydroxyl groups, some variations are considered to be within the scope of the present invention.

The present invention has newly discovered that an aggregate of polyhydroxylated tubular molecules, namely, a polyhydroxylated SWCNT material, as illustrated in FIGS. 20 & 21, in which the hydroxyl groups of the tubular molecules adjacent to each other act on each other to exhibit a high proton conductivity, that is, a high transfer or migration ability of H$^+$ or protons from the phenolic hydroxy groups that are contained in each of the tubular molecules of the polyhydroxylated SWCNT material or bulk material.

The proton conductor of the fourth embodiment includes the same type and arrangement of functional groups as the proton conductor of the other embodiments. For example, the proton conductor may include functional groups such as hydroxyl groups, OSO$_3$H groups, and combinations of these groups thereof.

The proton conductivity of the tubular carbonaceous material derivative that includes an aggregate of the tubular molecules having a number of functional groups, like the proton conductivity of the other proton conductor embodiments, is not limited by the environmental surroundings. In this way, an additional source of protons from migrating mediums, such as, water is not necessary in order to realize the desirable effects of the present invention. Similar to the other embodiments, the reason why the tubular carbonaceous material derivative can exhibit such a desirable proton conductivity effect is that a large amount of the functional groups can be introduced to a number of the tubular molecules of the tubular carbonaceous material so that the proton density which corresponds to the conductivity per unit volume of the conductor is very large in size.

In addition, the tubular carbonaceous material derivative is mostly composed of carbon atoms of each of the tubular molecules and therefore is light in weight and does not decompose as readily nor contain any contaminants. Moreover, the tubular carbonaceous material that is used for a base material for producing the derivative thereof can be produced by catalytic thermal decomposition of hydrocarbons at a low cost. As a result, the tubular carbonaceous material is regarded as a material that is desirable for reasons of resource, environment and economy. (Carbon Vol. 36, No. 11, pp. 1603–1612, 1998, 1978, Eiseier Science Ltd., Printed in Great Britain).

As previously discussed, the tubular carbonaceous material derivative includes a number of functional groups that provide the desirable proton conductivity effect. The functional groups of this derivative are similar in number and type and arrangement as the functional groups of the other embodiments as previously discussed. In addition, the tubular carbonaceous material derivatives can include an electron attractive group as previously discussed in the other embodiments of the proton conductor. With the presence of the electron attractive groups, the proton can more easily migrate or transfer between functional groups of the derivative due to the electron attractive effect of the electron attractive groups.

With respect to the number of functional groups of the tubular carbonaceous material derivative, the number is limited to the extent that it is less than the number of carbon atoms of the tubular carbonaceous material derivative. In addition, the number of functional groups may be limited to the extent that is necessary to cancel the electronic conductivity. For example, this number is preferably one or more per ten carbon atoms for a CNT material.

In addition to the functional groups and electron attractive groups, the proton conductor that mainly contains the tubular carbonaceous material derivatives may further contain another carbonaceous material derivative, such as, a fullerene derivative that includes a number of functional groups as previously discussed. Examples of fullerene molecules that make-up the fullerene derivative have been previously discussed and are further illustrated in FIGS. 3A and 3B.

By combining the tubular carbonaceous material with the fullerene material, the advantageous and desirable properties can be combined to meet the needs for a variety of different applications of these materials. The tubular carbonaceous material forms a strong and stable film that is suitable for an electrochemical device due to the fact that its axial length is much longer than its diameter and that the tubular molecules are entangled in a complicated form. This structure is stronger than an aggregate of a fullerene derivative that includes spherical fullerene molecules. However, the fullerene derivative more easily reacts with the functional groups and thereby a higher proton conductivity can be obtained on these materials versus the tubular carbonaceous materials.

According to the present invention, tubular carbonaceous material derivatives may be desirably formed as a film to be used for an electrochemical device such as a fuel cell. These materials can be formed as a film by a known extrusion molding technique and more preferably by dispersing the tubular carbonaceous material derivative in a liquid and filtering the dispersion. A solvent such as water is generally used as the liquid. However, the liquid is not particularly limited insofar as the derivative can be dispersed in the liquid.

By filtering the dispersion, the tubular carbonaceous material derivative is deposited in a film shape on the filter. The film does not contain any binder and is composed of only the tubular carbonaceous material derivative wherein the tubular molecules are entangled in complicated form. Such a film has a very high strength and can be easily peeled from the filter. In this case, if the fullerene derivative is dispersed in combination with the tubular carbonaceous material derivative in the liquid, it is possible to easily form a composite film which is composed of a combination of these materials which again does not contain any binder.

As previously discussed, the proton conductor that mainly includes a tubular carbonaceous material derivative is preferably used for a fuel cell. The fuel cell application of this material is similar to the application of the other previously discussed materials. The present invention will be more clearly understood with reference to the following examples:

I. Fullerene Derivative

<(Synthesis of Polyhydroxylated Fullerene>

The synthesis of polyhydroxylated fullerene was performed with reference to L. Y. Chaing, L. Y. Wang, J. W. Swircczewski, S. Soled and S. Cameron, J. Org. Chem. 59, 3960 (1994). First, 2 g of a powder of a mixture of $C_{60}$ and $C_{70}$. containing about 15% of $C_{70}$ was put in 30 ml of fuming sulfuric acid, and was stirred for three days while being kept in a nitrogen atmosphere at 60° C. The reactant was put little by little in diethyl ether anhydride cooled in an ice bath, and the deposit was fractionated by centrifugal separation, cleansed twice by diethyl ether and twice by a mixture of diethyl ether and acetonitrile at a mixing ratio of 2:1, and dried under a reduced pressure at 40° C. The deposit thus cleaned and dried was put into 60 ml of ion exchange water, and stirred for 10 hours at 85° C. while being subjected to bubbling using nitrogen. The reactant was subjected to centrifugal separation, to separate a deposit, and the deposit was cleaned several times by pure water, repeatedly subjected to centrifugal separation, and dried under a reduced pressure at 40° C. A brown powder thus obtained was subjected to FT-IR measurement. As a result, the IR spectrum of the brown powder nearly conformed to that of $C_{60}(OH)_{12}$ shown in the above document, and therefore, it was confirmed that the powder was the polyhydroxylated fullerene as the target material.

<Production of Pellet of Aggregate of Polyhydroxylated Fullerene>

Next, 90 mg of the powder of the polyhydroxylated fullerene was pressed in one direction at a pressure of about 5 tons/cm$^2$ into a circular pellet having a diameter of 15 mm. Since the compactivity of the powder of polyhydroxylated fullerene was excellent although the powder contained no binder resin, the powder of the polyhydroxylated fullerene could be easily formed into a pellet having a thickness of about 300 $\mu$m. Such a pellet is taken as a pellet in Inventive Example 1.

<Synthesis (Part 1) of Poly-Hydrogen-Sulfated Fullerene>

The synthesis of a poly-hydrogen-sulfated fullerene or hydrogen sulfated fullerene was performed with reference to the above-described document. First. 1 g of a powder of a polyhydroxylated fullerene was put in 60 ml of fuming sulfuric acid, and was stirred for three days while being kept in a nitrogen atmosphere at ordinary temperature. The reactant was put little by little in diethyl ether anhydride, cooled in an ice bath, and the deposit was fractionated by centrifugal separation, cleansed three-times by diethyl ether and twice by a mixture of diethyl ether and acetonitrile at a mixing ration of 2:1, and dried under a reduced pressure at 40° C. A powder thus obtained was subjected to FT-IR measurement. As a result, the IR spectrum of the powder nearly conformed to that of a poly-hydrogen-sulfated fullerene in which the hydroxyl groups were entirely replaced with hydrogen sulfated groups, i.e. —OSO$_3$H groups, shown in the document, and therefore, it confirmed that the powder was the poly-hydrogen-sulfated fullerene as the target material. The above-described reaction is represented, for example, concerning $C_{60}(OH)_y$ as follows (here and hereinafter):

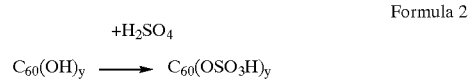

Formula 2

<(Production (Part 1) of Pellet of Aggregate of Poly-Hydrogen-Sulfated Fullerene>

Next, 70 mg of the powder of poly-hydrogen-sulfated fullerene was pressed in one direction at a pressure of about 5 tons/cm$^2$ into a circular pellet having a diameter of 15 mm. Since the compactivity of the powder of poly-hydrogen-sulfated fullerene was excellent although the powder contained no binder resin, the powder of poly-hydrogen-sulfated fullerene could be easily formed into a pellet having a thickness of about 300 μm. Such a pellet is taken as a pellet in Inventive Example 2.

<Synthesis (Part 2) of Partially Hydrogensulfate-Esterificated Polyfullerene Hydride (Polyhydroxyl Hydrogen Sulfated Fullerene)>

First, 2 g of powder of a mixture of $C_{60}$ and $C_{70}$ containing about 15% of $C_{70}$ was put in 30 ml of fuming sulfuric acid, and was stirred for three days while being kept in a nitrogen atmosphere at 60° C. The reactant was put little by little in diethyl ether cooled in an ice bath. It should be noted that diethyl ether not subjected to dehydration is used. The deposit thus obtained was fractionated by centrifugal separation, cleaned three times by diethyl ether and twice by a mixture of diethyl ether and acetonitrile at a mixing ratio of 2:1, and dried under a reduced pressure at 40° C. A powder thus obtained was subjected to FT-IR measurement. As a result, the IR spectrum of the powder nearly conformed to that of a fullerene derivative containing both of the hydroxyl and OSO$_3$H groups shown in the document, and therefore, it was confirmed that the powder was the poly-hydroxyl hydrogen sulfated fullerene as the target material. The above-described reactions are represented, for example, concerning $C_{60}$ as follows (here and hereinafter):

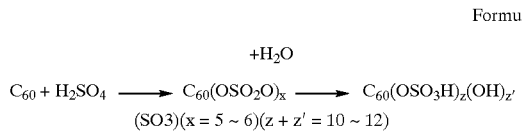

Formula 3

<(Production (Part 2) Pellet of Aggregate of Polyhydroxyl Hydrogen Sulfate Fullerene>

Next, 80 mg of the powder of a polyhydroxyl hydrogen sulfated fullerene was pressed in one direction at a pressure of about 5 tons/cm$^2$ into a circular pellet having a diameter of 15 mm. Since the compactivity of the powder of poly-hydroxyl hydrogen sulfated fullerene was excellent although the powder contained no binder resin, the powder of the polyhydroxyl hydrogen sulfated fullerene could be easily formed into a pellet having a thickness of about 300 μm. Such a pellet is taken as a pellet in Inventive Example 3.

For comparison, 90 mg of a powder of the fullerene molecules used as a the raw material for synthesis in the above examples was pressed in one direction at a pressure of about 5 tons/cm$^2$ into a circular pellet having a diameter of 15 mm. Since the compactivity of the powder of the fullerene molecules was relatively excellent although the powder contained no binder resin, the powder of the fullerene molecules could be relatively easily formed into a pellet having thickness of about 300 μm. Such a pellet is taken as a pellet in Comparative Example 1.

<Measurement of Proton Conductivities of Pellets of Inventive Examples and Comparative Example>

To measure a proton conductivity of each of the pellets of Inventive Example 1–3 and Comparative Example 1, both sides of the pellet were held between aluminum plates each having the same diameter as that of the pellet, that is, 15 mm, and AC voltages (amplitude: 0.1 V) at frequencies ranging from 7 MHz to 0.01 Hz are applied to the pellet, to measure a complex impedance at each frequency. The measurement was performed under a dry atmosphere.

Figure 10A:
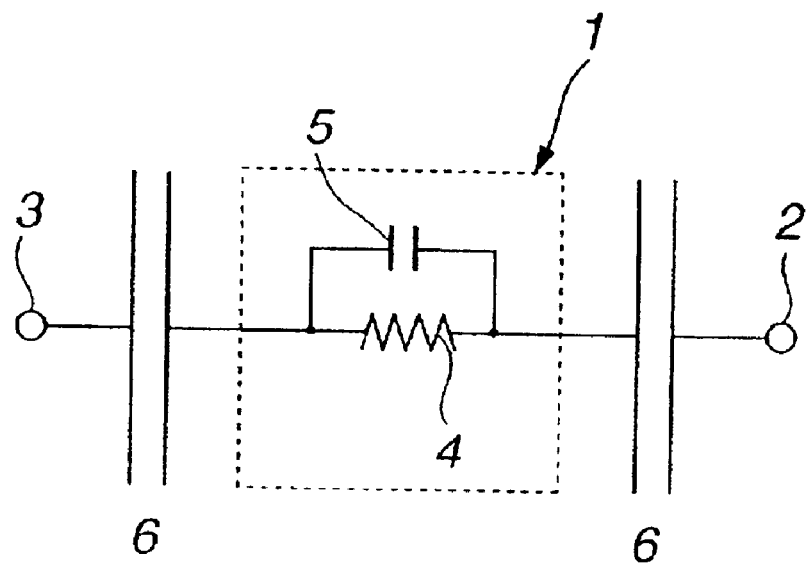
FIGS. 10A and 10B are diagrams depict equivalent circuits of a experimental pellets in Inventive Example 1 and Comparative Example 1.

With respect to the above impedance measurement, a proton conducting portion 1 of a proton conductor composed of the above pellet electrically constitutes an equivalent circuit shown in FIG. 10A, in which capacitances 6 and 6' are formed between first and second electrodes 2 and 3 with the proton conducting portion 1 expressed by a parallel circuit of a resistance 4 and a capacitance 5 held therebetween. In addition, the capacitance 5 designates a delay effect (phase delay at a high frequency) upon migration of protons, and the resistance 4 designates a parameter of difficulty of migration of protons.

The measured impedance Z is expressed by an equation $Z=Re(Z)+i \cdot Im(Z)$. The frequency dependency on the proton conducting portion expressed by the above equivalent circuit was examined.

Figure 10B:
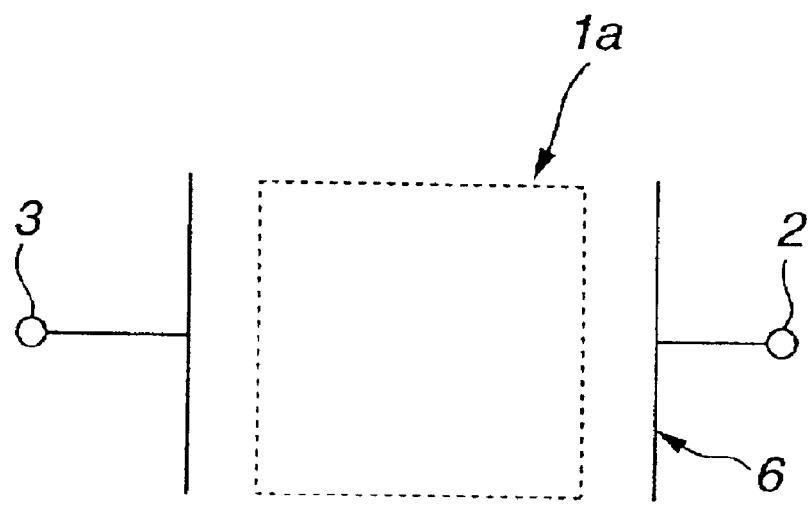

In addition, FIG. 10B shows an equivalent circuit of a proton conductor (Comparative Example to be described later) using the typical fullerene molecules without functional groups.

Figure 11:
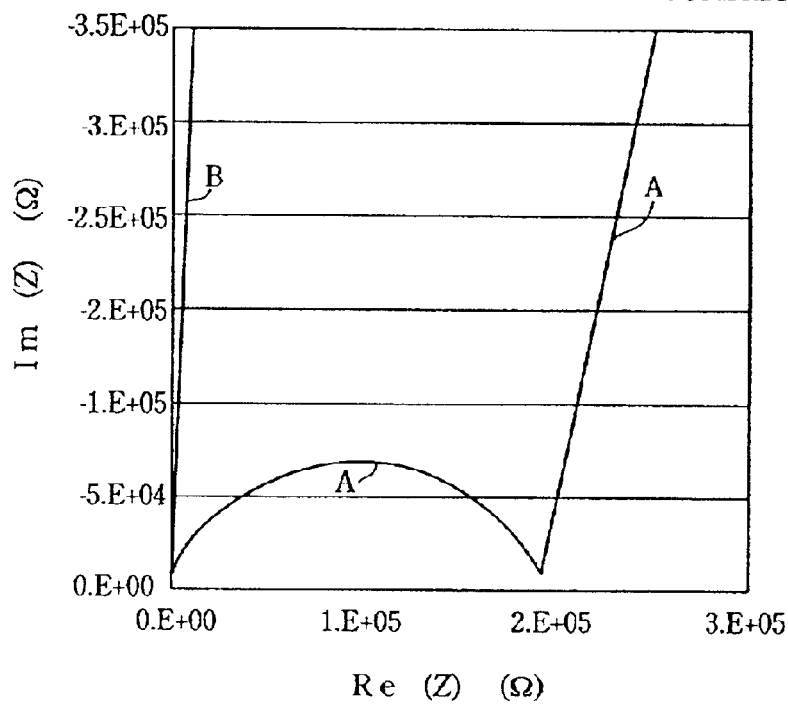
FIG. 11 is a graph showing a result of measuring the complex impedances of a pellet (a proton conductor containing a fullerene derivative) in Inventive Example 1 and a pellet in Comparative Example 1.

FIG. 11 shows results of measuring the impedances of the pellets of Inventive Example 1 and Comparative Example 1.

Referring to FIG. 11, for Comparative Example 1, the frequency characteristics of the complex impedance is nearly the same as the behavior of a single capacitor, and the conductance of charged particles (electrons, ions and the like) of the aggregate of the fullerene molecules is not observed at all; while, for Inventive example 1, the impedance in a high frequency region depicts a flattened but very smooth single semi-circular arc, which shows the conductance of some charged particles in the pellet, and the imaginary number portion of the impedance is rapidly raised in a low frequency region, which shows the occurrence of blocking of charged particles between the aluminum electrode and the pellet as gradually nearing the DC voltage. With respect to the blocking of the charged particles between the aluminum electrode and the pellet in Inventive Example 1, the charged particles on the aluminum electrode side are electrons, and accordingly, it is apparent that the charged particles in the pellets are not electrons or holes but ions, more specifically, protons in consideration of the configuration of the fullerene derivative.

The conductivity of the above-described charged particles can be calculated on the basis of an intercept of the circular-arc on the high frequency side with the X-axis. For the pellet of Inventive Example 1, the conductivity of the charged particles become about $5 \times 10^{-6}$ S/cm. The pellets of Inventive Examples 2 and 3 were subjected to the same measurement as described above. As a result, the whole shape of the frequency characteristics of the impedance in each of the Inventive Examples 2 and 3 is similar to that in Inventive example 1; however, as shown in Table 1, the conductivity of charged particles in each of Inventive Examples 2 and 3, obtained on the basis of an intercept of a circular-arc portion with the X-axis, is different than in Inventive Example 1.

TABLE 1

Conductivities of Pellets of Proton Conductors in
Inventive Examples 1, 2 and 3 (at 25° C.)

| Kind of Pellets | Conductivity (S/cm) |
| --- | --- |
| Inventive Example 1 | $5 \times 10^{-6}$ |
| Inventive Example 2 | $9 \times 10^{-4}$ |
| Inventive Example 3 | $2 \times 10^{-5}$ |

As shown in Table 1, the conductivity of the pellet of the fullerene derivative containing the —$OSO_3H$ groups cause ionization of hydrogen easier than the hydroxyl groups. The results of Table 1 also show that the aggregate of the fullerene derivative containing the hydroxyl groups and $OSO_3H$ groups can exhibit, in a dry atmosphere, a good proton conductivity at ordinary temperature.

Figure 12:
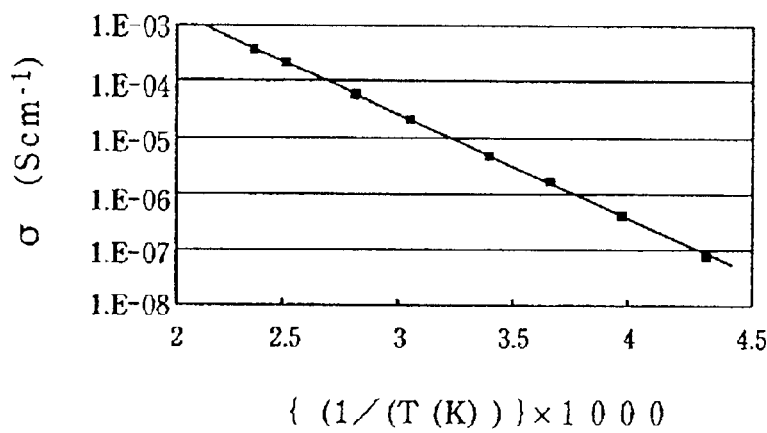
FIG. 12 is a graph showing a temperature dependence on the proton conductivity of the pellet in Inventive Example 1.

Next, the complex impedance of the pellet produced in Inventive Example 1 was measured in a temperature range from 160° C. to −40° C., and the conductivity of the pellet was calculated on the basis of a circular-arc portion on the high frequency side of the complex impedance curve of the pellet measured at each temperature to examine the temperature dependency on the conductivity. As the results shown in FIG. 12 (the Arrhenius plot), it is apparent that the conductivity changed in a straight-line or linear fashion with respect to a change in temperature within the measured temperature range of 160° C. to −40° C. In other words, data of FIG. 12 shows that a single ion conduction mechanism can occur at least within the temperature range of 160° C. to −40° C. The proton conductor mainly containing the fullerene derivative according to the present invention, therefore, can exhibit a good proton conductivity in a wide temperature range from −40° C. to 160° C. that includes ordinary temperatures.

<Forming a Film Including Polyhydroxylated Fullerene of Example 1 and Generating Electricity Experiment Using the Film>

0.5 g of the powder of the polyhydroxylated fullerene was mixed with 1 g of tetrahydrofurane (THF), and the mixture was ultrasonic-vibrated for 10 minutes, resulting in the complete dissolution of the polyhydroxylated fullerene in THF. After fabricating a carbon electrode, a film of the polyhydroxylated fullerene was formed by the steps of: masking the surface of the electrode by a plastic mask having a rectangular opening, dripping the above-described solution in the opening, spreading the solution in the opening, drying in a room temperature in order to vaporize THF, and removing the mask. The same amount of electrode described above, with its downward surface having a catalyst, was laid on the film. The upper electrode was pressed by about 5 tons/cm² to complete a composite. This composite was incorporated in a fuel cell as shown in FIG. 9. A generating electricity experiment was performed by supplying hydrogen gas to one electrode and air to another electrode in the fuel cell.

Figure 13:
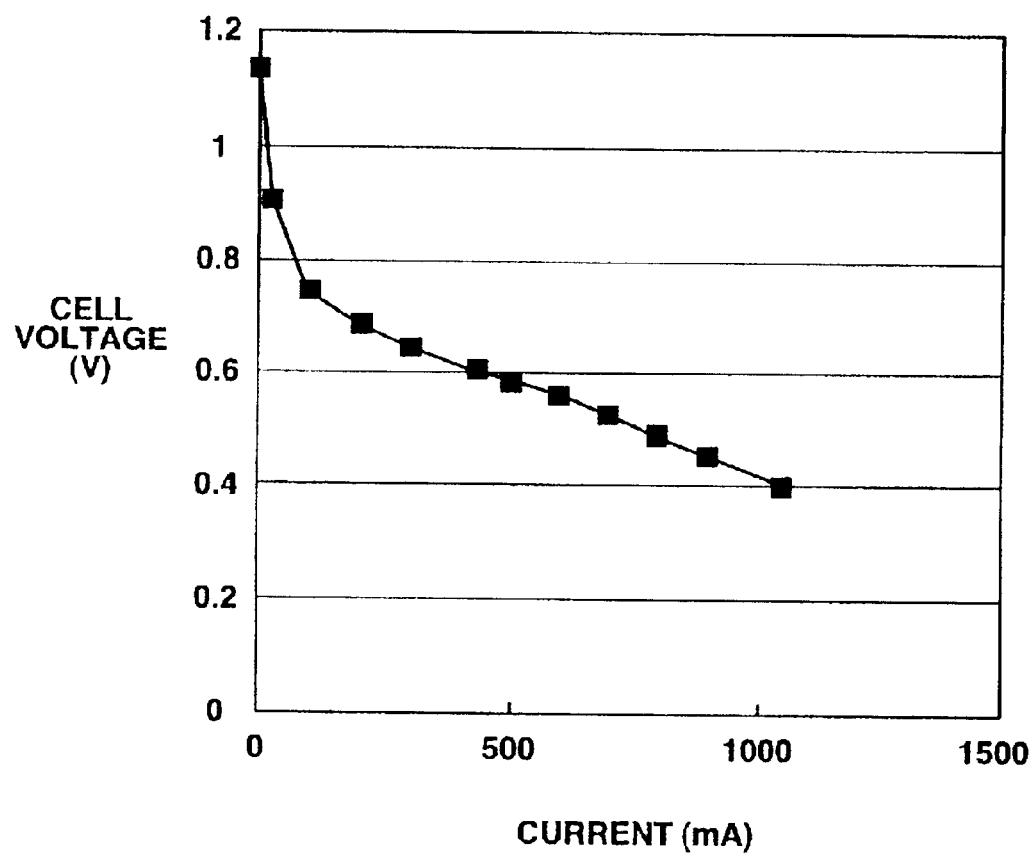
FIG. 13 is a diagram showing results of the generating electricity experiment using the fullerene derivative in Inventive Example 1.

The experimental result is shown in FIG. 13. The open circuit voltage was about 1.2V, and the characteristic of the closed circuit voltage was also excellent against the current value for the fuel cell.

II. Fullerene Derivative and Polymer Material

<Production (Part A) of Pellet of Polyhydroxylated Fullerene and Polymer Material>

First, 70 mg of the powder of the fullerene derivative obtained by the above-described synthesis was mixed with 10 mg of a powder of polyvinylidene fluoride, followed by addition of 0.5 ml of dimethylformamide thereto, and the powders thus mixed were stirred in the solvent. The mixture was poured in a circular mold having a diameter of 15 mm, and the solvent was evaporated under a reduced pressure. The mixture from which the solvent was evaporated was then pressed into a pellet having a diameter of 15 mm and a diameter of about 300 μm. Such a pellet is taken as a pellet 1A of Inventive Example 4.

<Production (Part B) of Pellet of Polyhydroxylated Fullerene and Polymer Material>

Similarly, 70 mg of the powder of the fullerene derivative was mixed with a dispersion containing 60% of a fine powder of polytetrafluoroethylene (PTFE) in such a manner that the content of PTFE became 1 wt % on the basis of the total amount, and kneaded. The mixture thus kneaded was molded into a pellet having a diameter of 15 mm and a thickness of about 300 μm. Such a pellet is taken as a pellet 1B of Inventive Example 4.

<Synthesis (Part 1) of Poly-Hydrogen-Sulfated Fullerene>

The synthesis of a poly-hydrogen-sulfated fullerene was performed with reference to the above-described document. First, 1 g of the powder of a polyhydroxylated fullerene was put in 60 ml of fuming sulfuric acid, and was stirred for three days while kept in a nitrogen atmosphere at ordinary temperature. The reactant was put little by little in diethyl ether anhydride cooled in an ice bath, and the deposit was fractionated by centrifugal separation, cleaned three times by diethyl ether and twice by a mixture of diethyl ether and acetonitrile at a mixing ratio of 2:1, and dried under a reduced pressure at 40° C. A powder thus obtained was subjected to FT-IR measurement. As a result, the IR spectrum of the powder nearly conformed to that of a fullerene derivative in which the hydroxyl groups were all hydrogen sulfate groups shown in the document, and therefore, it was confirmed that the powder was the poly-hydrogen-sulfated fullerene as the target material.

<Production (Part 1A) of Pellet of Hydrogen Sulfated Fullerene and Polymer Material>

First, 70 mg of the powder of the poly-hydrogen-sulfated fullerene derivative was mixed with 10 mg of a powder of polyvinylidene fluoride, followed by addition of 0.5 ml of dimethylformamide thereto, and the powders thus mixed were stirred in the solvent. The mixture was poured in a circular mold having a diameter of 15 mm, and the solvent was evaporated under a reduced pressure. The mixture from which the solvent was evaporated was then pressed into a pellet having a diameter of 15 mm and a thickness of about 300 μm. Such a pellet is taken as a pellet of 2A of Inventive Example 5.

<Production (Part 1B) of Pellet of Hydrogen Sulfated Fullerene and Polymer Material>

Similarly, 70 mg of the powder of the poly-hydrogen-sulfated fullerene was mixed with a dispersion containing 60% of a fine powder of polytetrafluoroethylene (PTFE) in such a manner that the content of PTFE became 1 wt % on the basis of the total amount, and kneaded. The mixture thus kneaded was molded into a pellet having a diameter of 15 mm and a thickness of about 300 μm. Such a pellet is taken as a pellet of 2B of Inventive Example 5.

<Synthesis (Part 2) of Polyhydroxyl Hydrogen Sulfated Fullerene>

First, 2 g of a powder of a mixture of $C_{60}$ and $C_{70}$ containing about 15% of $C_{70}$ was put in 30 ml of fuming sulfuric acid, and was stirred for three days while being kept in a nitrogen atmosphere at 60° C. The reactant was put little by little in diethyl ether cooled in an ice bath. It should be noted that diethyl ether not subjected to dehydration is used. The deposit thus obtained was fractionated by centrifugal separation, cleaned three times by diethyl ether and twice by a mixture of diethyl ether and acetonitrile at a mixing ratio of 2:1, and dried under a reduced pressure at 40° C. A powder thus obtained was subjected to FT-IR measurement. As a result, the IR spectrum of the powder nearly conformed to that of a fullerene derivative containing the hydroxyl groups and $OSO_3H$ groups shown in the document, and therefore, it was confirmed that the powder was the polyhydroxyl hydrogen sulfated fullerene as the target material.

<Production (Part 2A) of Pellet of Polyhydroxyl Hydrogen Sulfated Fullerene and Polymer Material>

First, 70 mg of a powder of the polyhydroxyl hydrogen sulfated fullerene derivative was mixed with 10 mg of a powder of polyvinylidene fluoride, followed by addition of 0.5 ml of dimethylformamide thereto, and the powders thus mixed were stirred in the solvent. The mixture was poured in a circular mold having a diameter of 15 mm, and the solvent was evaporated under a reduced pressure. The mixture from which the solvent was evaporated was then pressed into a pellet having a diameter of 15 mm and a thickness of about 300 $\mu$m. Such a pellet is taken as a pellet of 3A of Inventive Example 6.

<Production (Part 2B) of Pellet of Polyhydroxylated Hydrogen Sulfated Fullerene and Polymer Material>

Similarly, 70 mg of the powder of the polyhydroxylated hydrogen sulfated fullerene was mixed with a dispersion containing 60% of a fine powder of polytetrafluoroethylene (PTFE) in such a manner that the content of PTFE became 1 wt % on the basis of the total amount, and kneaded. The mixture thus kneaded was molded into a pellet having a diameter of 15 mm and a thickness of about 300 $\mu$m. Such a pellet is taken as a pellet of 3B of Inventive Example 6.

<Production (Part A) of Pellet of Fullerene>

For comparison, 90 mg of a powder of the fullerene molecules used as the raw material for the synthesis in the above examples was mixed with 10 mg of a powder of polyvinylidene fluoride, followed by addition of 0.5 ml of dimethylformamide thereto, and the powders thus mixed were stirred in the solvent. The mixture was poured in a circular mold having a diameter of 15 mm, and the solvent was evaporated under a reduced pressure. The mixture from which the solvent was evaporated was then pressed into a pellet having a diameter of 15 mm and a thickness of about 300 $\mu$m. Such a pellet is taken as a pellet of Comparative Example 2.

<Production (Part B) of Pellet of Fullerene>

For comparison, 70 mg of the powder of the fullerene molecules used as the raw material for synthesis in the above examples was mixed with a dispersion containing 60% of a fine powder of polytetrafluoroethylene (PTFE) in such a manner that the content of PTFE became 1 wt % on the basis of the total amount, and kneaded. The mixture thus kneaded was molded into a pellet having a diameter of 15 mm and a thickness of about 300 $\mu$m. Such a pellet is taken as a pellet of Comparative Example 3.

<Measurement of Proton Conductivities of Pellets of Inventive Examples and Comparative Example>

To measure a proton conductivity of each of the pellets of Inventive Example 4–6 and Comparative Example 2, both sides of the pellet were held between aluminum plates each having the same diameter as that of the pellet, that is, 15 mm, and AC voltages (amplitude: 0.1 V) at frequencies ranging from 7 MHz to 0.01 Hz are applied to the pellet, to measure a complex impedance at each frequency. The measurement was performed under a dry atmosphere.

With respect to the above impedance measurement, a proton conducting portion 1 of a proton conductor composed of the above pellet electrically constitutes an equivalent circuit shown in FIG. 10A, in which capacitances 6 and 6' are formed between first and second electrodes 2 and 3 with the proton conducting portion 1 expressed by a parallel circuit of a resistance 4 and a capacitance 5 held therebetween. In addition, the capacitance 5 designates a delay effect (phase delay at a high frequency) upon migration of protons, and the resistance 4 designates a parameter of difficulty of migration of protons. The measured impedance Z is expressed by an equation of $Z=Re(Z)+i \cdot Im(Z)$. The frequency dependency on the proton conducting portion expressed by the above equivalent circuit was examined. In addition, FIG. 10B shows an equivalent circuit of a proton conductor (Comparative Example to be described later) using the typical fullerene molecules that contain no functional groups capable of dissociating or transferring protons.

Figure 14:
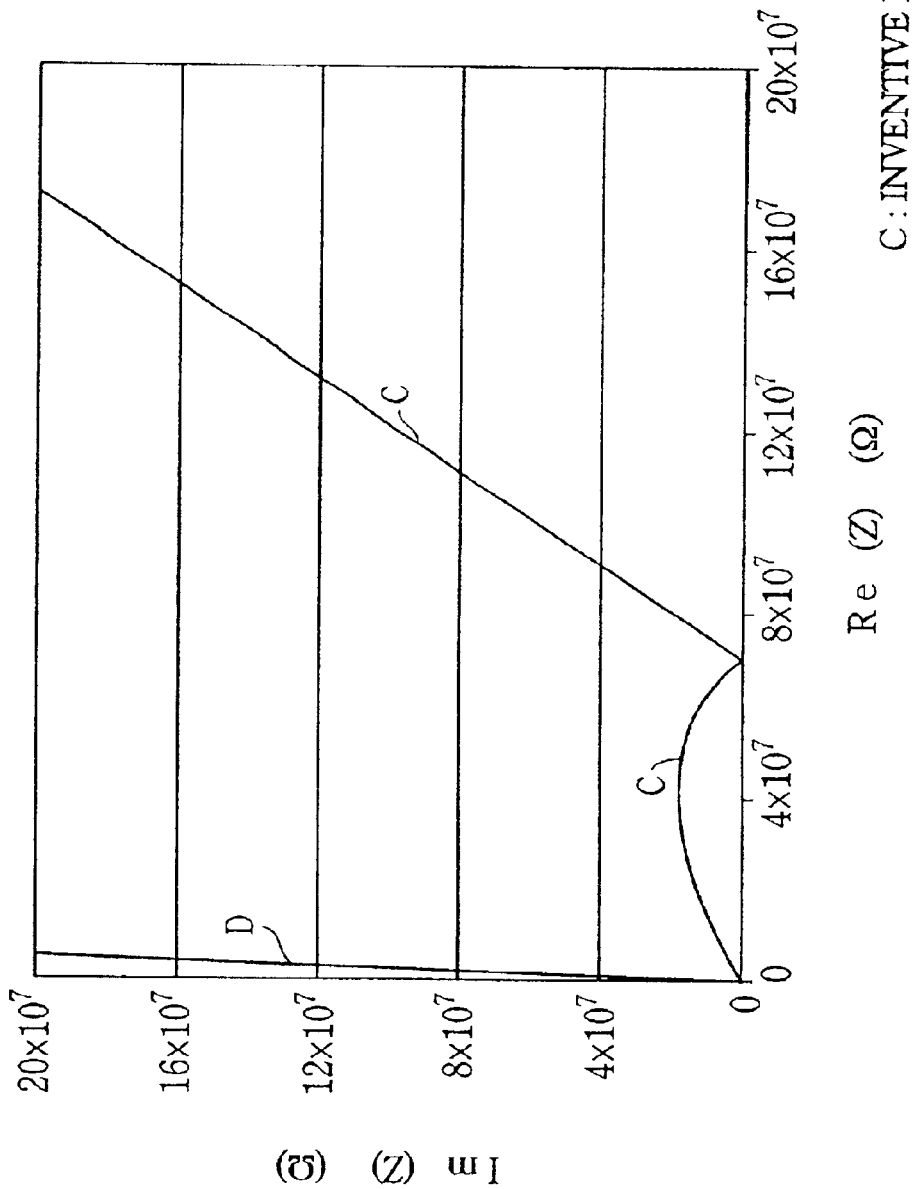
FIG. 14 is a graph showing a result of measuring the complex impedance of a pellet (a proton conductor containing a fullerene derivative and a polymer material) in Inventive Example 4 and a pellet in Comparative Example 2.

FIG. 14 shows results of measuring the impedances of the pellet 1A of Inventive Example 4 and the pellet of Comparative Example 2.

Referring to FIG. 14, for the pellet of Comparative Example 2, the frequency characteristics of the complex impedance is nearly the same as the behavior of a single capacitor, and the conductance of charged particles (electrons, ions and the like) of the aggregate of the fullerene molecules is not observed at all; while, for the pellet 1A of Inventive Example 4, the impedance in a high frequency region depicts a flattened but very smooth single semicircular arc, which shows the conductance of some charged particles in the pellet, and the imaginary number portion of the impedance is rapidly raised in a low frequency region, which shows the occurrence of blocking of charged particles between the aluminum electrode and the pellet as gradually nearing the DC voltage. With respect to the blocking of the charged particles between the aluminum electrode and the pellet 1A of Inventive Example 4, the charged particles on the aluminum electrode side are electrons, and accordingly, it is apparent that the charged particles in the pellets are not electrons or holes but ions, more specifically, protons in consideration of the configuration of the fullerene derivative.

The conductivity of the above-described charged particles can be calculated on the basis of an intercept of the circular-arc on the high frequency side with the X-axis. For the pellet 1A of Inventive Example 4, the conductivity of the charged particles become about $1 \times 10^{-6}$ S/cm. The pellets of 1B of Inventive Example 4, the pellets 2A and 2B of Inventive Example 5, and the pellets of 3A and 3B of Inventive Example 6 were subjected to the same measurement as described above. As a result, the whole shape of the frequency characteristics of the impedance in each of the pellets 1B, 2A and 2B, and 3A and 3B is similar to that of 1A of Inventive Example 4; however, as shown in Table 2, the conductivity of charged particles in each of the pellets of 1B, 2A and 2B, and 3A and 3B, obtained on the basis of an intercept of a circular-arc portion with the X-axis, is different from that in the pellet 1A.

TABLE 2

Conductivities of Pellets of Proton Conductors in
Inventive Examples 4, 5 and 6 (at 25° C.)

| Kind of Pellets | Conductivity (S/cm) |
| --- | --- |
| Pellet 1A of Inventive Example 4 | $1 \times 10^{-6}$ |
| Pellet 2A of Inventive Example 5 | $2 \times 10^{-4}$ |
| Pellet 3A of Inventive Example 6 | $6 \times 10^{-5}$ |
| Pellet 1B of Inventive Example 4 | $3 \times 10^{-6}$ |
| Pellet 2B of Inventive Example 5 | $7 \times 10^{-4}$ |
| Pellet 3B of Inventive Example 6 | $3 \times 10^{-6}$ |

As shown in Table 2, in both of the pellet types A and B of the Inventive Examples 4, 5, and 6, the conductivity of the pellet of the fullerene derivative containing the $OSO_3H$ groups is larger than that of the pellet of the fullerene derivative containing the hydroxyl groups. The reason for this is that the $OSO_3H$ groups cause ionization of hydrogen more easily than the hydroxyl groups. The results of Table 2 also show that the aggregate of the fullerene derivative containing the hydroxyl groups and $OSO_3H$ groups can exhibit, in a dry atmosphere, a good proton conductivity at ordinary temperature.

Figure 15:
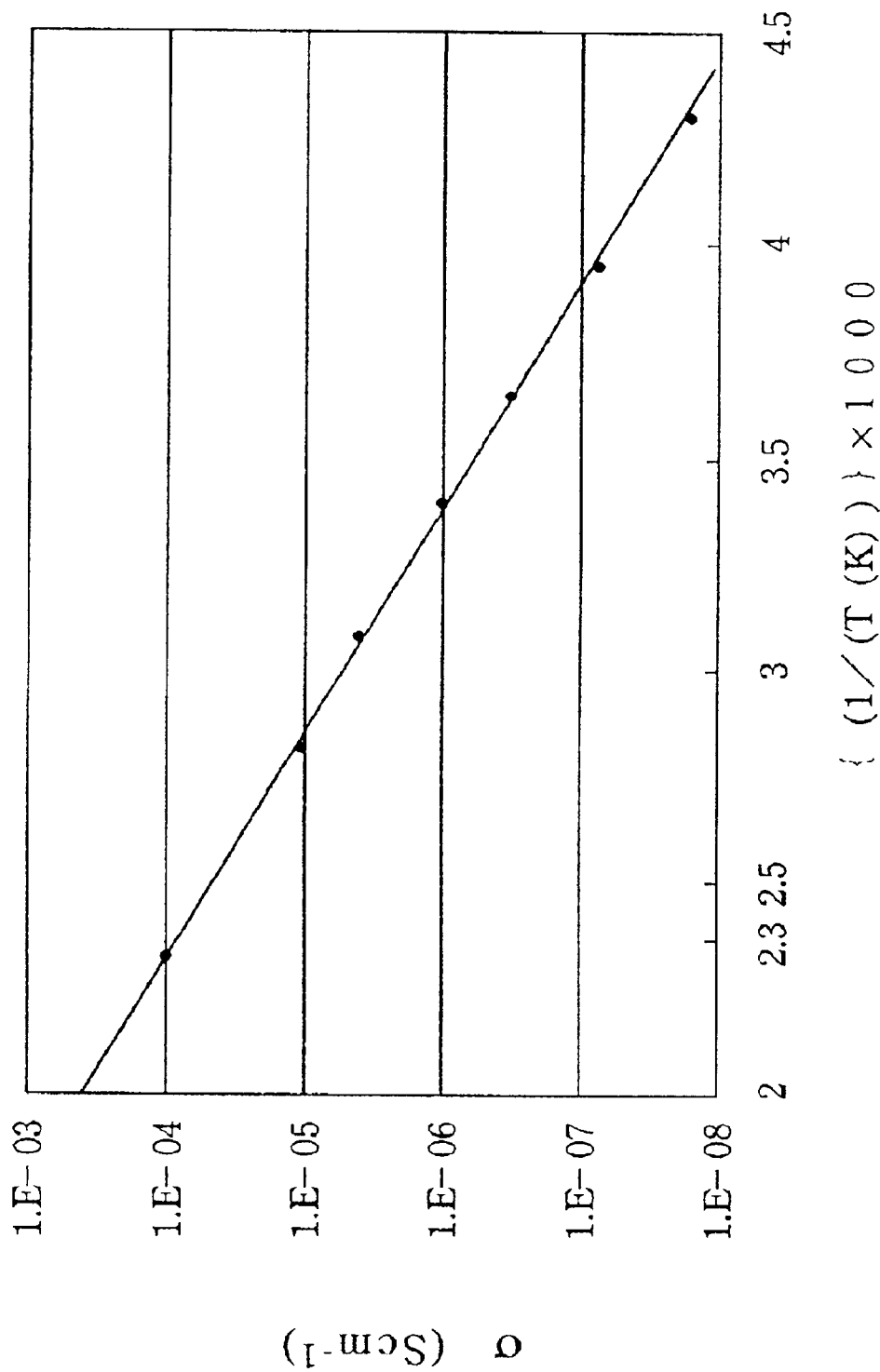
FIG. 15 is a graph showing a temperature dependence on the proton conductivity of the pellet in Inventive Example 4.

Next, the complex impedance of the pellet 1A of Inventive Example 4 was measured in a temperature range from 160° C. to −40° C., and the conductivity of the pellet was calculated on the basis of a circular-arc portion on the high frequency side of the complex impedance curve of the pellet measured at each temperature to examine the temperature dependency on the conductivity. The results are shown in FIG. 15 as the Arrhenius plot. From the data shown in FIG. 15, it is apparent that the conductivity and temperature exist in a linear relationship at least within the temperature range of 160° C. to −40° C. In other words, data of FIG. 15 shows that a single ion conduction mechanism can proceed in the temperature range of 160° C. to −40° C. The proton conductor mainly containing the fullerene derivative and a polymer material according to the present invention, therefore, can exhibit a good proton conductivity in a wide temperature range including ordinary temperature, particularly, ranging from a high temperature of 160° C. to a low temperature of −40° C.

III. Carbon Cluster Derivative

<Production (Part 1) of Carbon Cluster Derivative>

Arc discharge was performed by applying a current of 200 A between both electrodes composed of carbon bars in 0.05 MPa of an argon gas, to thus obtain 1 g of a carbon powder. The carbon powder was mixed with 100 ml of 60% fuming sulfuric acid, and kept for three days in a nitrogen flow at 60° C. The heating was performed by using a water bath. The reaction solution was dropped little by little in 500 ml of pure water, and a solid matter was separated from the water solution by centrifugal separation method. The solid matter was cleaned several times by diethyl ether anhydride, and dried for five hours under a reduced pressure at 40° C. The resultant powder was dissolved in 10 ml of tetrahydrofurane (THP), an insoluble component removed by filtering, and the solvent was evaporated under a reduced pressure to obtain a solid matter wherein the solid matter of 50 mg was pressed at a force of 7 tons/cm² into a circular pellet having a diameter of 15 mm. Such a pellet is taken as a pellet of Inventive Example 7.

<Measurement of Proton Conductivity of Pellet of Carbon Cluster Derivative>

The AC impedance of the pellet of Inventive Example 7 was measured in a dry air in accordance with the same manner as described above. As a result, it was confirmed that an impedance behavior resulting from ion conductance appeared in a frequency region of 10 MHz or less. The conductivity of the pellet of Inventive Example 7 was calculated, on the basis of the diameter of a circular-arc curve of the impedance behavior, at $3.0 \times 10^{-4}$ (S/cm).

<Production (Part 2) of Carbon Cluster Derivative>

Arc discharge was performed by applying a current of 200 A between both electrodes composed of carbon bars in 0.05 MPa of an argon gas, to thus obtain 1 g of a carbon powder. The carbon powder was dissolved in toluene, an insoluble component was removed by filtering, and the solvent was evaporated under a reduced pressure to obtain a powder again. The resultant powder was mixed with 100 ml of 60% fuming sulfuric acid, and kept for three days under a nitrogen flow at 60° C. The heating was performed by using a water bath. The reaction solution was dropped little by little in 500 ml of pure water, and a solid matter was separated from the water solution by centrifugal separation method. The solid matter was cleaned several times by diethyl ether anhydride, and dried for five hours under a reduced pressure at 40° C. The solid matter of 50 mg was under a force of 7 tons/cm² into a circular pellet of Inventive Example 8.

<Measurement of Proton Conductivity of Pellet of Carbon Cluster Derivative>

The AC impedance of the pellet of Inventive Example 8 was measured in a dry air in accordance with the same manner as described above. As a result, it was confirmed that an impedance behavior resulting from ion conductance appeared in a frequency region of 10 MHz or less. The conductivity of the pellet of Inventive Example 8 was calculated, on the basis of the diameter of a circular-arc curve of the impedance behavior, at $3.4 \times 10^{-4}$ (S/cm).

Figure 16:
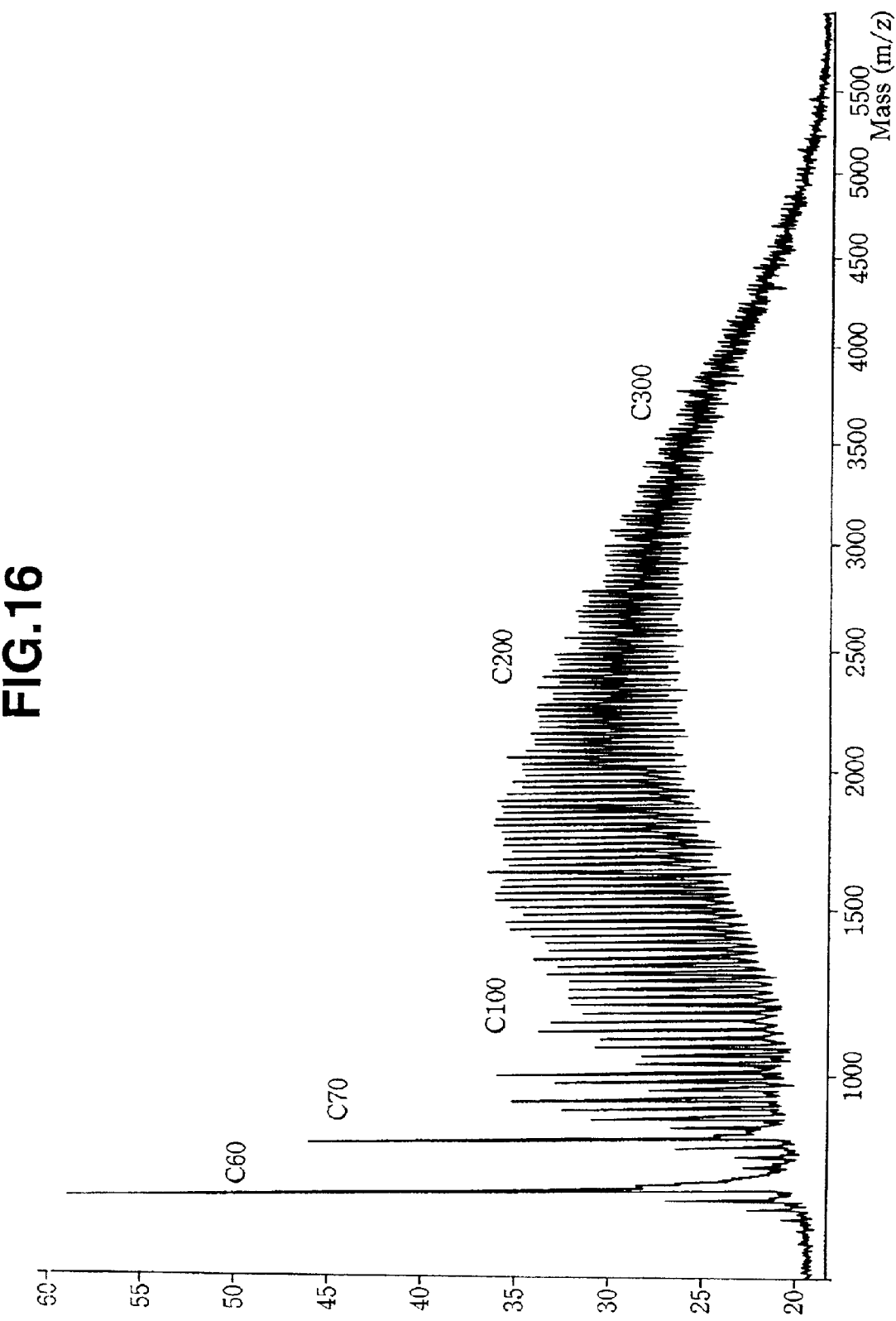
FIG. 16 is a graph showing a TOF-MS spectrum of a carbon powder produced by an arc discharge process using a carbon electrode.

The main component of the carbon powder obtained by arc discharge was carbon clusters or molecules of carbon clusters not having a closed structure, such as, a cage structure, but having a structure at least part of which has open ends. In addition, molecules having a structure with good electronic conductivity, similar to the graphite structure, which are slightly contained in the carbon cluster molecules, often obstruct the function of the ionic conductor and thereby they are removed after acid treatment in Inventive Example 7 and directly after arc discharge in Inventive Example 8. As a result, it was confirmed by the AC impedance method that the pellet has no electronic conductivity. FIG. 16 shows the TOF-MS spectrum of carbon powder obtained by arc discharge. As shown in FIG. 16, most of the carbon powder has a mass number of 5500 or less, that is, the carbon number of 500 or less. Since the carbon—carbon bonding distance of the carbon powder is less than 2 Å, the diameter of each of the carbon clusters of the powder is less than 100 nm.

IV. Tubular Carbonaceous Material Derivative

<Synthesis (Part 1) of a Polyhydroxylated SWCNT Material>

A refined SWCNT material was prepared and then burned for ten hours at 250° C. under a fluorine gas in order to obtain polyfluorinated SWCNT. The polyfluorinated SWCNT was placed in pure water and refluxed for three days at 100° C. while being strongly stirred in order to substitute the fluorine atoms for hydroxyl groups thereby resulting in the polyhydroxylated SWCNT material which is identified as a material in Inventive Example 9.

<Synthesis of Hydrogen Sulfated SWCNT>

Polyhydroxylated SWCNT produced in the same manner as that in Inventive Example 9 was placed in fuming sulfuric acid and stirred for three days at 60° C. in order to replace the hydroxyl groups with the $OSO_3H$ groups thereby resulting in the hydrogen sulfated SWCNT material as identified in Inventive Example 10.

<Synthesis (Part 2) of Polyhydroxylated SWCNT>

A refined SWCNT material was prepared and then subjected to oxygen plasma treatment. Then, the atmosphere in the chamber was replaced with hydrogen and the material was subsequently subjected to hydrogen plasma treatment in order to obtain the polyhydroxylated SWCNT material as identified as Inventive Example 11.

<Production of Sample Films>

Each of the above three materials was dispersed in water and the dispersion was filtered on a filter paper having pores of 0.2 $\mu$m by suction in order to deposit the film on the filter paper. The amount of the dispersion to be filtered was adjusted to form the film having a thickness of 100 $\mu$m. The film deposited on the filter paper could be easily peeled therefrom. These films thus obtained are taken as films in Inventive Examples 9, 10 and 11. A material obtained by mixing the material in Inventive Example 10 with a polyhydrogen-sulfated fullerene derivative at a weight ratio of 1:1 was filtered in the same manner as described above to form a film as identified in Inventive Example 12. Further, an SWCNT material that contains no functional groups was filtered in the same manner as described above to form the film which is identified as Comparative Example 4.

<Measurement of Proton Conductivities of the Film>

To measure a proton conductivity of each of the films in Inventive Examples 9 to 12 and Comparative Example 4 both sides of the film were held between aluminum foil which were cut into a disc shape having a diameter 15 mm. The disc was held between electrodes, and AC voltages (amplitude: 0.1 V) at frequencies ranging from 7 MHz to 0.01 Hz were applied to the film to measure a complex impedance at each frequency. The measurement was performed under a dry atmosphere.

The measurement result of the film in Comparative Example 4 will be described below. The complex impedance of the film was fixed at a low resistance, that is, was not changed over the above frequency range due to the fact that the electronic conductivity of the SWCNT material of Comparative Example 4 is high.

As a result, it was revealed that the film in Comparative Example 4 cannot be used as an ionic conductor.

The measurement results of the films in Inventive Examples 9–12 will be described below. A complex impedance of the film of Inventive Example 10 is representatively shown in FIG. 26. Referring to FIG. 26, the impedance in a high frequency region depicts a flattened but very smooth semi-circular curve, which shows the conductance of some charged particles in the film and the imaginary number portion of the impedance is rapidly raised in a low frequency region, which shows the occurrence of the blocking of charged particles between the aluminum electrodes and the film as gradually nearing to a DC voltage.

With respect to the blocking of the charged particles between the aluminum electrode and the film in Inventive Example 10, the charged particles on the aluminum electrode side are electrons, and accordingly, it is apparent that the charged particles in the film are not electrons or holes but ions, more specifically, protons in considering of the structure of the tubular carbonaceous derivative that forms the film.

With respect to the films in Inventive Examples 9, 11 and 12, the behavior of these films are similar to that of the film in Inventive Example 10 as observed although there was a difference in the size of the circular arc therebetween. Accordingly, it was revealed that the films in Inventive Examples 9–12 desirably function as a tubular carbonaceous material derivative of a proton conductor.

With respect to the above impedance measurements, the proton conducting portion 1 of the film-like proton conductor constitutes an electrically equivalent circuit in which a capacitance is formed between first and second electrodes with a resistance in the proton conducting portion held therebetween as similarly identified in the previously discussed embodiments and as further illustrated in FIG. 10A. In addition, the capacitance designates a delay effect (phase delay at a high frequency) upon migration of protons, and the resistance designates a parameter of difficulty of migration of protons. The measured impedance Z is expressed by the equation as previously discussed in other embodiments. The frequency dependency on the proton conductivity portion was examined.

The conductivity of the above described charged particles can be calculated on the basis of an intercept of the circular-arc on the high frequency side of with the X-axis. The conductivity of the film in Inventive Example 10 is about $2 \times 10^{-5}$ S/cm. The conductivities of the film in Inventive Examples 9, 11, and 12 are $2 \times 10^{-7}$ S/cm, $7 \times 10^{-8}$ (S/cm) and $8 \times 10^{-4}$ (S/cm), respectively. The conductivity for each of Inventive Examples 9–12 were measure at 25° C.

In comparing the conductivity of Inventive Examples 9–12, it is apparent that the tubular carbonaceous material derivative that contain the hydrogen sulfated functional groups, i.e. the $—OSO_3H$ groups, are larger than the conductivity of the tubular carbonaceous material derivative that contain the hydroxyl groups. The reason for this difference was discussed in relation to previous embodiment of the present invention. The comparison of Inventive Examples 9–12 also demonstrates that the aggregate of the tubular carbonaceous material derivative that contains either or both of the hydroxyl and hydrogen sulfated groups, even in a dry atmosphere, desirably displays a proton conductivity at ordinary temperatures.

As is apparent from the above description, since the first proton conductor according to the first embodiment mainly contains a fullerene derivative that includes functional groups, it can exhibit a high proton conductivity, even in a dry state, in a wide temperature range including ordinary temperature. Since the electrochemical device using the first proton conductor is not limited by an atmosphere, its construction can be simplified and minimized in size.

Since the first proton conductor can be produced of a fullerene derivative, it is possible to efficiently produce the first proton conductor without use of any binder resin, and hence to enhance the proton conductivity of the first proton conductor and reduce the weight thereof.

Since the second proton conductor according to the second embodiment can be obtained by mixing the fullerene derivative with a polymer material, a high film formation ability can be given, together with the above performance of the first proton conductor, to the second proton conductor, so that the second proton conductor can be used as a thin film having a high strength, a good gas permeation preventative ability and a high proton conductivity. The electrochemical device, such as, a fuel cell using the second proton conductor has a performance comparable to that of the electrochemical device using the first proton conductor, and also exhibits the effect of the second proton conductor in the form of a thin film.

Since the third proton conductor according to the third embodiment mainly contains a carbon cluster derivative in which functional groups are introduced to each of the carbon clusters which are the base material of the carbon cluster derivative, it can exhibit effects similar to those obtained by each of the first and second embodiments in terms of proton conductivity, operation temperature, simplification of the system, miniaturization and economy. Further, since each carbon cluster contains a large number of carbon atoms closely bonded to each other, it is less susceptible to deterioration by oxidation, and is advantageous in that the selection range of the raw material can be extended.

Since the fourth proton conductor according to the fourth embodiment mainly contains a tubular carbonaceous material derivative that includes a number of functional groups, this type of proton conductor can exhibit desirable effects that are similar to those which were demonstrated and obtained by each of the first, second and third embodiments with regards to proton conductivity, operation temperature, simplification of construction, miniaturization, and economy for a fuel cell using the proton conductor. Further, according to the present invention as detailed in the fourth embodiment, a tubular carbonaceous material derivative film that has high strength and good proton conductivity is desirably suitable for an electrochemical device, in particular, a fuel cell. This film can be obtained by dispersing the tubular carbonaceous material derivative in a liquid and filtering the dispersion.

Although modifications and changes may be suggested by those skilled in the art, it is the intention of the inventors to embody within the patent warranted hereon all changes and modifications as reasonably and properly come within their contribution to the art.

We claim as our invention:

1. A proton conductor comprising:
   a carbon cluster derivative comprising a plurality of functional groups so as to be capable of transferring a plurality of protons between each of the functional groups of the carbon cluster derivative; and a plurality of carbon clusters each including one or more of the functional groups wherein the carbon clusters are bonded together.

2. The proton conductor according to claim 1, wherein the carbon clusters have a substantially fullerene structure.

3. A proton conductor comprising a polymer comprising a fullerene structure having one or more proton releasing groups.

4. The proton conductor according to claim 3, wherein the polymer comprises a polymer main chain including the fullerene structure.

5. The proton conductor according to claim 3, wherein the polymer comprises a polymer side chain including the fullerene structure.

6. The proton conductor according to claim 3, wherein the proton releasing group is selected from the group consisting of —OH, —OSO$_3$H, —SO$_3$H, —COOH, —OPO(H)$_3$, and combinations thereof.

7. The proton conductor according to claim 3, wherein the fullerene structure includes an electron attracting group.

8. The proton conductor according to claim 3, wherein the electron attracting group is selected from the group consisting of a nitro group, a carbonyl group, a carboxyl group, a nitride group, an alkyl halide group, a halogen group and combinations thereof.

9. The proton conductor according to claim 3, further comprising a binder material.

10. The proton conductor according to claim 9 wherein the binder material has substantially no electrical conductivity.

11. The proton conductor according to claim 9, wherein the binder material is selected from the group consisting of polyfluoroethylene, polyvinylidene fluoride, polyvinyl alcohol and combinations thereof.

12. A proton conductor comprising a polymer comprising a fullerene structure having one or more proton releasing group wherein the fullerene structure includes a plurality of fullerene molecules bonded together.

13. The proton conductor according to claim 12 wherein the fullerene molecules are bonded directly together.

14. The proton conductor according to claim 12 wherein the fullerene molecules are bonded together via a spacer molecule.

* * * * *